US012592647B2

(12) United States Patent
Mukherjee et al.

(10) Patent No.: US 12,592,647 B2
(45) Date of Patent: Mar. 31, 2026

(54) MULTIPLE-PORT BIDIRECTIONAL DC-DC CONVERTERS AND CONTROL METHODS THEROF

(71) Applicant: Delta Electronics, Inc., Taipei (TW)

(72) Inventors: Satyaki Mukherjee, Mountain View, CA (US); Misha Kumar, Cary, NC (US); Boyi Zhang, Apex, NC (US); Peter Mantovanelli Barbosa, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 328 days.

(21) Appl. No.: 18/330,205

(22) Filed: Jun. 6, 2023

(65) Prior Publication Data

US 2024/0413760 A1      Dec. 12, 2024

(51) Int. Cl.
*H02M 3/335* (2006.01)
*H02M 1/42* (2007.01)
*H02M 3/00* (2006.01)

(52) U.S. Cl.
CPC ..... *H02M 3/33584* (2013.01); *H02M 1/4208* (2013.01); *H02M 3/01* (2021.05); *H02M 3/33573* (2021.05)

(58) Field of Classification Search
CPC ........ H02M 1/42; H02M 1/4208; H02M 3/01; H02M 3/335; H02M 3/33573; H02M 3/33584
See application file for complete search history.

(56) References Cited

U.S. PATENT DOCUMENTS

| | | | | |
|---|---|---|---|---|
| 5,430,633 A | * | 7/1995 | Smith | ............... H02M 3/33569 |
| | | | | 363/20 |
| 8,619,438 B2 | * | 12/2013 | Wang | ................ H02M 3/33571 |
| | | | | 363/21.02 |
| 9,960,712 B2 | | 5/2018 | Rodriguez et al. | |
| 10,696,182 B2 | | 6/2020 | Khaligh et al. | |

(Continued)

FOREIGN PATENT DOCUMENTS

| | | |
|---|---|---|
| CN | 115995985 A | 4/2023 |
| TW | 202205794 A | 2/2022 |

OTHER PUBLICATIONS

Krishnaswami et al., Three-Port Series-Resonant DC-DC Converter to Interface Renewable Energy Sources With Bidirectional Load and Energy Storage Ports. IEEE Transactions on Power Electronics. Oct. 2009;24(10):2289-2297.

(Continued)

*Primary Examiner* — Gary L Laxton
(74) *Attorney, Agent, or Firm* — Wolf, Greenfield & Sacks, P.C.

(57) ABSTRACT

A DC-DC converter includes a first port at a primary side of a transformer including a primary-side converter with primary-side switches and a second port at a secondary side including a second port converter with second-port switches and a resonant circuit including a first inductor, a capacitor, and a second inductor in LCL-T arrangement. A third port at the secondary side includes a third port converter with third-port switches. A controller controls the primary-side switches, the second-port switches, and the third-port switches at fixed-frequency for operation in a first mode, in which the first port supplies power to the second port and the third port, in a second mode, in which the second port supplies power to the first port and the third port, or in a third mode, in which the second port supplies power to the third port while the first port is disconnected.

20 Claims, 16 Drawing Sheets

(56)                References Cited

U.S. PATENT DOCUMENTS

| | | | |
|---|---|---|---|
| 11,101,737 B2 | 8/2021 | Sun et al. | |
| 11,165,338 B2 | 11/2021 | Dai et al. | |
| 2010/0135045 A1* | 6/2010 | Inoue ................. | H02M 7/5387 |
| | | | 363/17 |
| 2016/0172984 A1* | 6/2016 | Takagi ............... | H02M 3/1582 |
| | | | 363/17 |
| 2022/0045618 A1 | 2/2022 | Kumar et al. | |
| 2022/0321016 A1 | 10/2022 | Khaligh et al. | |
| 2023/0155514 A1 | 5/2023 | Saha et al. | |
| 2024/0364214 A1* | 10/2024 | Kim ........................ | H01F 27/38 |

OTHER PUBLICATIONS

Krishnaswami et al., Constant Switching Frequency Series Resonant Three-port Bi-directional DC-DC Converter. IEEE Power Electronics Specialists Conference (PESC). Jun. 2008:1640-1645.
Extended European Seach Report dated Nov. 4, 2024, in connection with European Application No. 24179842.0.
Kumar et al., Isolated Three-Port Bidirectional DC-DC Converter for Electric Vehicle Applications. IEEE Applied Power Electronics Conference and Exposition (APEC). Mar. 2, 20220. pp. 2000-2007.
Mukherjee et al., a High Power Density Wide Range DC-DC Converter for Universal Electric Vehicle Charging. IEEE Transactions on Power Electronics. Feb. 2023;38(2):1998-2012.
Twiname et al., A New Resonant Bidirectional DC-DC Converter Topology. IEEE Transactions on Power Electronics. Sep. 2014;29(9):4733-40.
European Communication pursuant to Article 94(3) mailed Oct. 22, 2025 for European Application No. 24179842.0.

* cited by examiner

CONTROL SWITCHES $Q_1$-$Q_4$, $SR_{(1)1}$-$SR_{(1)4}$ TO $SR_{(n)1}$-$SR_{(n)4}$

CONTROL SWITCHES $Q_1$-$Q_4$, $SR_{(1)1}$-$SR_{(1)4}$
TO $SR_{(n)1}$-$SR_{(n)4}$
CONTROL RELAYS $S_1$-$S_{n+1}$,
$R_{1,1}$ - $R_{1,2}$ TO $R_{n+1,1}$ - $R_{n+1,2}$, AND
$Y_1$ TO $Y_{n+1}$

CONTROLLER  110

CONTROL SWITCHES $Q_1$-$Q_4$, $SR_{(1)1}$-$SR_{(1)4}$, $SR_{(2)1}$-$SR_{(2)4}$

CONTROL SWITCHES $Q_1$-$Q_4$, $SR_{(1)1}$-$SR_{(1)4}$
TO $SR_{(2)1}$-$SR_{(2)4}$
CONTROL RELAYS $S_1$-$S_3$,
$R_{1,1}$ - $R_{1,2}$ TO $R_{3,1}$ - $R_{3,2}$, AND
$Y_1$ TO $Y_3$

CONTROLLER
110

CONTROL SWITCHES $Q_1$-$Q_4$, $SR_{(1)1}$-$SR_{(1)4}$
TO $SR_{(2)1}$-$SR_{(2)4}$
CONTROL RELAYS $S_1$-$S_3$,
$R_{1,1}$ - $R_{1,2}$ TO $R_{3,1}$ - $R_{3,2}$, AND
$Y_1$ TO $Y_3$

CONTROLLER
110

CONTROL SWITCHES $Q_1$-$Q_4$, $SR_{(1)1}$-$SR_{(1)4}$
TO $SR_{(2)1}$-$SR_{(2)4}$
CONTROL RELAYS $S_1$-$S_3$,
$R_{1,1}$ - $R_{1,2}$ TO $R_{3,1}$ - $R_{3,2}$, AND
$Y_1$ TO $Y_3$

CONTROLLER
110

MULTIPLE-PORT BIDIRECTIONAL DC-DC CONVERTERS AND CONTROL METHODS THEROF

BACKGROUND

This invention relates to a DC-DC converter and, more particularly, to a multiple-port bidirectional DC-DC converter with fixed switching frequency operation.

In many applications, a DC-DC converter is used to adjust a source DC voltage to the level needed by a particular load. The source DC voltage may be obtained by rectifying an alternative current (AC) source (e.g., grid) as part of a power supply that has the DC-DC converter as the last stage, following a power factor correction (PFC) converter, for example. Generally, a DC-DC converter may include a DC-AC converter that converts the source DC to AC, a transformer that passes the AC signal by electromagnetic induction to a secondary side of the transformer, and an AC-DC converter on the secondary side to provide the voltage level needed at the output. A multiple-port DC-DC converter allows a single DC source to supply more than one port at the secondary side of the transformer, with each of those ports connected to a different load. For redundancy and reliability, it may be desirable to have bidirectional operation, which refers to a port that is typically a store of energy being able to act as a source, instead.

SUMMARY

According to one or more embodiments, a DC-DC converter includes a first port at a primary side of a transformer including a primary-side converter with primary-side switches, and a second port at a secondary side of the transformer. The second port includes a second port converter with second-port switches and a resonant circuit comprising a first inductor ($L_1$), a capacitor (C), and a second inductor ($L_2$) arranged in a "T" configuration (LCL-T). A third port at the secondary side of the transformer includes a third port converter with third-port switches. A controller controls the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

According to another embodiment, a power supply includes a power factor correction (PFC) converter to convert an alternating current (AC) source to (DC) and a DC-DC converter coupled to the PFC. The DC-DC converter includes a first port at a primary side of a transformer including a primary-side converter with primary-side switches, and a second port at a secondary side of the transformer. The second port includes a second port converter with second-port switches and a resonant circuit comprising a first inductor ($L_1$), a capacitor (C), and a second inductor ($L_2$) arranged in a "T" configuration (LCL-T). A third port at the secondary side of the transformer includes a third port converter with third-port switches. A controller controls the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

According to another embodiment, a method of assembling a DC-DC converter includes assembling a first port at a primary side of a transformer to include a primary-side converter with primary-side switches, and assembling a second port at a secondary side of the transformer to include a second port converter with second-port switches and a resonant circuit comprising a first inductor ($L_1$), a capacitor (C), and a second inductor ($L_2$) arranged in a "T" configuration (LCL-T). The method also includes assembling a third port at the secondary side of the transformer to include a third port converter with third-port switches. The method further includes configuring a controller to control the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

The foregoing has outlined some of the pertinent features of the disclosed subject matter. These features are merely illustrative.

BRIEF DESCRIPTION OF THE DRAWINGS

The examples described throughout the present document will be better understood with reference to the following drawings and descriptions. In the figures, like-referenced numerals designate corresponding parts throughout the different views.

DETAILED DESCRIPTION

Figure 1:
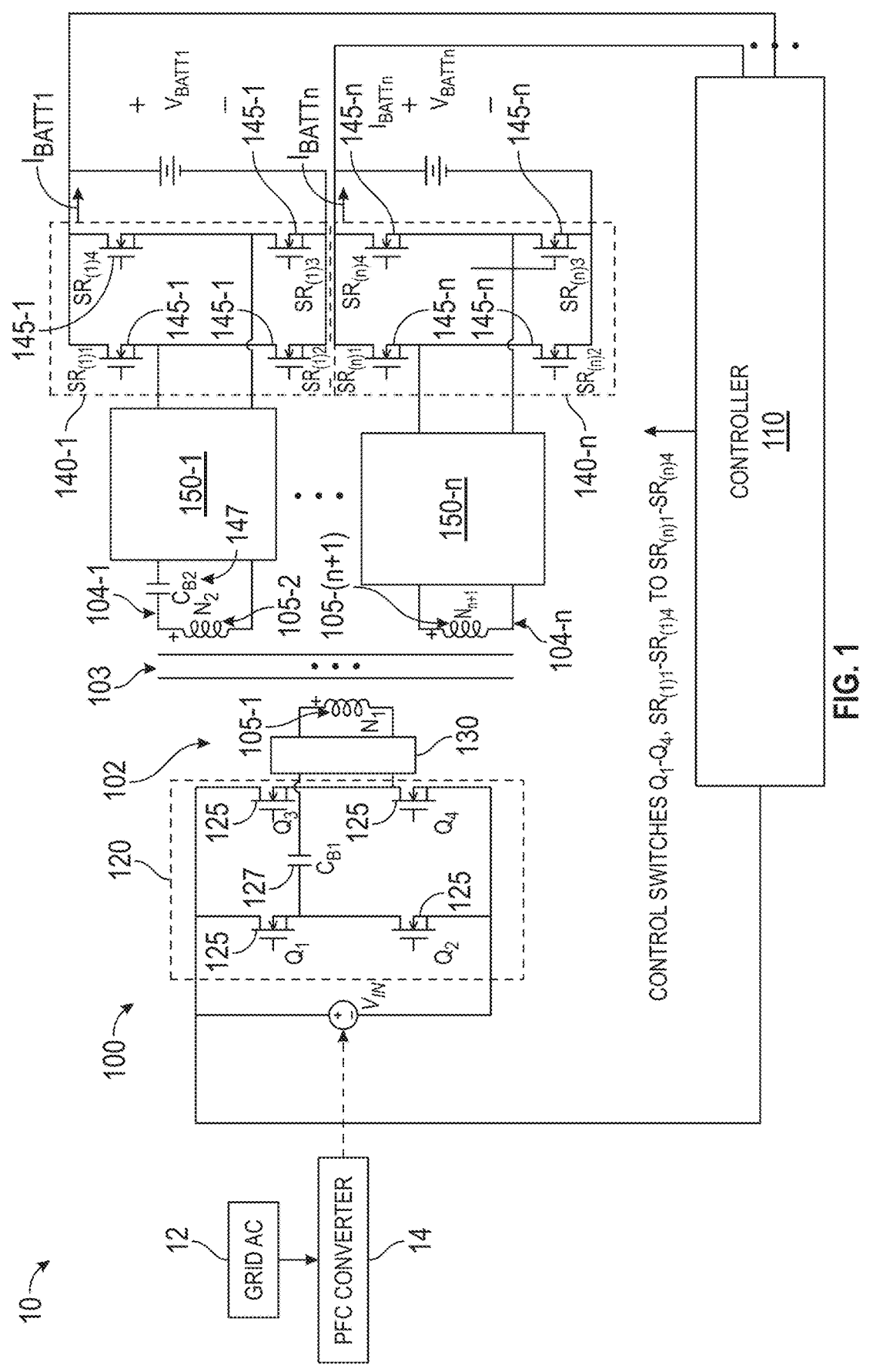
FIG. 1 is a circuit diagram of a generalized multiple-port bidirectional DC-DC converter according to exemplary embodiments.

Reference will now be made to the drawings to describe the present disclosure in detail. It will be understood that the drawings and exemplified embodiments are not limited to the details thereof. Modifications may be made without departing from the spirit and scope of the disclosed subject matter.

As previously noted, a DC-DC converter may be implemented as a multiple-port bidirectional DC-DC converter. Multiple port refers to three or more ports with a source port on a primary side of a transformer and two or more ports on a secondary side of the transformer. In this case, a single DC source is converted at the two or more ports. Bidirectional refers to the transfer of power in both directions within the DC-DC converter, such that one or more of the ports (on the secondary side) that is typically supplied with energy may instead act as a source according to exemplary modes of operation.

The bidirectional configuration provides redundancy and increases reliability. Such reliability may be helpful for DC micro-grids, charging stations, and electric vehicles (EVs), among other applications. For example, in an EV, a multiple-port DC-DC converter may be used to supply loads associated with convenience features (e.g., infotainment system) as well as loads associated with comfort features (e.g., heating system). A bidirectional arrangement facilitates power transfer among the ports, on the secondary side of the transformer, that supply the loads, as well as to the source, as needed.

Generally, each port of the DC-DC converter includes a full or half-bridge converter circuit and may include an impedance or resonant circuit. In terms of bidirectional power flow, a prior approach involves using an inductor-capacitor-inductor (LCL) resonant circuit in a T configuration (LCL-T) at a secondary-side port. The LCL-T resonant circuit facilitates controlling switches of the converter circuits at a fixed frequency, rather than at a variable frequency, with a phase shift between control of the switches on the primary and secondary sides. However, this configuration can be problematic in some cases (e.g., for low-voltage loads), because the additional components of the LCL-T resonant circuit increase losses.

Another prior approach involves using a series resonant converter (SRC), which includes a capacitor and inductor in series with the transformer. In a configuration involving SRC, output voltage can be regulated with secondary-side switch control. That is, a time delay may be introduced in the secondary-side switching pulses with respect to the primary-side switching pulses. Typically, SRC with secondary-side switch control requires variable switching frequency control to maintain zero voltage switching (ZVS) turn-on of the switches. Also, at light load operation, with variable switching frequency control, the switching frequency may become so high that the switches lose ZVS. However, if the switches are operated with a fixed switching frequency, the switches cannot achieve ZVS turn on. In this case, in order to achieve ZVS, the magnetizing inductance of the transformer would need to be decreased.

Yet another prior approach involves a dual-active bridge (DAB) converter at a secondary port side. DAB converters are operated with fixed switching frequency and a phase shift between the switches of the primary-side converter and the secondary-side converter. However, at light loads, the stored energy in the DAB inductor may be insufficiently small and may result in loss of ZVS.

In some situations, a multiple-port bidirectional DC-DC converter with fixed switching frequency operation is appreciated. Such a converter may simplify the design of magnetic components and also simplify the control. Embodiments detailed herein relate to multiple-port bidirectional DC-DC converters with a LCL-T resonant circuit at least at one port and an SRC or DAB converter or another LCL-T at least at another port on the secondary side. This results in fixed frequency control of the switches of the converters and also allows achieving ZVS even at lighter loads without the need to operate at very high switching frequencies. As detailed, numerous embodiments facilitate identifying the best configuration based on the application (e.g., DC micro-grid, charging station, EV) and expected loads.

FIG. 1 is a circuit diagram of a multiple-port bidirectional DC-DC converter 100 according to exemplary embodiments. The exemplary generalized multi-port bidirectional DC-DC converter 100 shown in FIG. 1 has a primary-side port 102 on a primary side of a transformer 103 and n secondary-side ports 104-1 through 104-$n$ (generally referred to as secondary-side port 104) at a secondary side of the transformer 103 for a total of n+1 ports. Thus, the transformer 103 is an (n+1)-winding transformer with windings 105-1 through 105-($n$+1) (generally referred to as winding 105), each with a number of turns $N_1$ through $N_{n+1}$. A controller 110 is coupled to each of the ports 102, 104, as further discussed.

The exemplary multi-port bidirectional DC-DC converter 100 is shown in FIG. 1 as being part of a power supply 10. As shown, the power supply 10 is a two-stage supply with a power factor correction (PFC) converter 14 as a first stage and the multiple-port bidirectional DC-DC converter 100 as the second stage. The PFC converter 14 performs power factor correction and rectifies a grid AC 12 in the exemplary case. The PFC converter 14 provides a DC output, which may be used as the source voltage VIN at the primary side of the multiple-port bidirectional DC-DC converter 100.

A first exemplary mode of operation of the multiple-port bidirectional DC-DC converter 100 may involve the source voltage VIN on the primary side supplying one or more of the n secondary-side ports 104 on the secondary side of the transformer 103 via inductive coupling. The source voltage VIN may be obtained via power factor correction of a grid voltage as part of a charging station, for example. A primary-side converter 120 may convert the source voltage VIN to AC, based on control of the primary-side switches 125 of the primary-side converter 120, to facilitate the inductive coupling via the transformer 103.

On the secondary side, at two or more ports 104, secondary-side converters 140-1 through 140-$n$ (generally referred to as secondary-side converter 140) may respectively convert the inductively coupled AC to DC currents $I_{BATT1}$ through $I_{BATTn}$, resulting, respectively, in voltages $V_{BATT1}$ through $V_{BATTn}$ that are provided to loads coupled to the secondary-side ports 104. The secondary-side converters 140 each include sets of switches 145-1 through 145-$n$ (generally referred to as secondary-side switches 145). In the exemplary multiple-port bidirectional DC converter 100 shown in FIG. 1, the switches 145-1 are labelled $SR_{(1)1}$ through $SR_{(1)4}$ and the switches 145-$n$ are labelled $SR_{(n)1}$ through $SR_{(n)4}$. The converters 120, 140 are shown as full bridge switching circuits in the exemplary embodiment illustrated in FIG. 1.

A second exemplary mode of operation of the multiple-port bidirectional DC-DC converter 100 may involve a power source (e.g., $V_{BATT1}$) of one of the secondary-side ports (e.g., 104-1) supplying the primary-side port 102, as well as one or more other secondary-side ports (104-2 through 104-$n$). A third exemplary mode of operation of the multiple-port bidirectional DC-DC converter 100 may involve a power source (e.g., $V_{BATT1}$) of one of the secondary-side ports (e.g., 104-1) supplying only one or more other secondary-side ports (104-2 through 104-$n$), with the primary-side port 102 disconnected (i.e., with all the primary-side switches 125 open).

Each of these exemplary modes and the control of the switches 125, 145 used to implement the modes is detailed for different embodiments of the multiple-port bidirectional DC-DC converter 100. However, the examples are not intended to limit all the modes of operation that are possible for the multiple-port bidirectional DC-DC converter 100 according to the various embodiments. In general, in addition to the primary-side port 102, any secondary-side port 104 may supply one or more of the other ports 102, 104.

As indicated, the primary-side port 102 may include a primary-side network 130 and the secondary-side ports 104-1 through 104-$n$ may respectively include secondary-side networks 150-1 through 150-$n$ (generally referred to as secondary-side network 150). Blocking capacitor 127 $C_{B1}$ on the primary side and blocking capacitor 147 $C_{B2}$ at the secondary-side port 104-1 on the secondary side prevent saturation of the transformer 103 by blocking any DC excitation from the inverter (i.e., primary-side converter 120) and/or rectifier (i.e., secondary-side converter 140-1).

Figure 2:
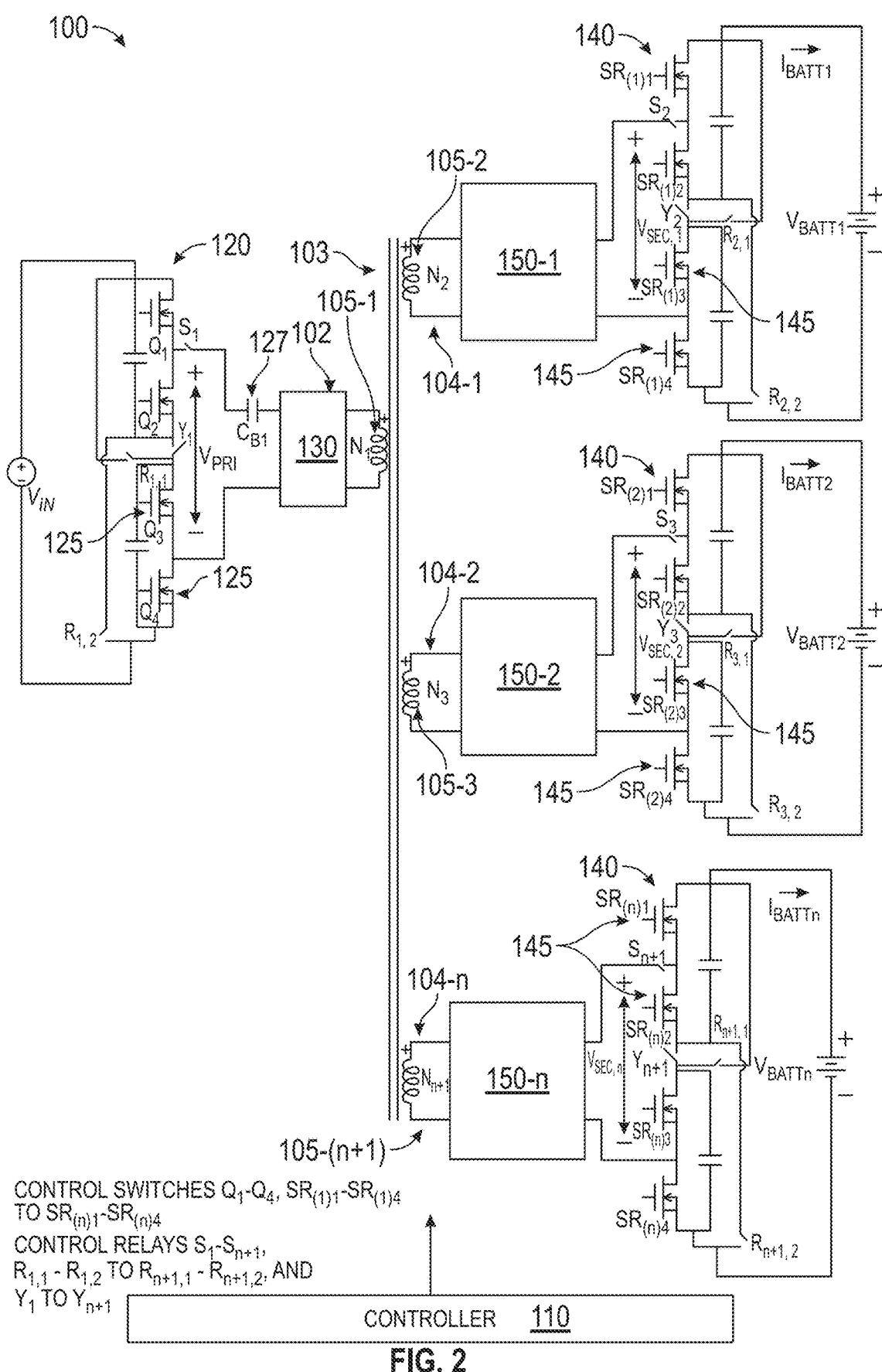
FIG. 2 is a circuit diagram of a generalized dynamically configurable multiple-port bidirectional DC-DC converter according to exemplary embodiments.

FIG. 2 is a circuit diagram of a dynamically configurable multiple-port bidirectional DC-DC converter 100 according to exemplary embodiments. Like the exemplary embodiment shown in FIG. 1, the exemplary multiple-port bidirectional DC-DC converter 100 of FIG. 2 also includes a primary-side port 102 and n secondary-side ports 104 of an (n+1)-winding transformer 103. In addition, each port 102, 104 may have a respective network 130, 150 between the winding and converter 120, 140, as indicated for the illustrated primary-side port 102 and secondary-side ports 104-1, 104-2, and 104-$n$.

However, while the embodiment shown in FIG. 1 illustrates full bridge operation of the converters 140, the exemplary embodiment shown in FIG. 2 facilitates dynamic operation in various modes and configurations. For example, the circuit diagram shown in FIG. 2 facilitates disconnection of any of the ports 102, 104. Specifically, the relay $S_k$ associated with a given winding 105-$k$ may be opened to disconnect the corresponding port 102, 104. For example, opening the relay $S_1$ would disconnect the primary-side port 102, while opening the relay $S_2$ would disconnect the secondary-side port 104-1. Default operation may involve all the ports 102, 104 being enabled and, thus, all the relays $S_1$ through $S_{(n+1)}$ being closed. Operation in the third exemplary mode of operation may involve opening relays $S_k$ of all ports 102, 104 except those of secondary-side ports 104-1 and 104-$n$ so that the secondary-side port 104-1 supplies only the secondary-side port 104-$n$, for example.

In addition to facilitating the dynamic disconnection of a port 102, 104 via a relay $S_k$, the configuration shown in FIG. 2 facilitates dynamic operation in full or half-bridge mode at any of the ports 102, 104 based on additional relays. For a given port 102, 104 associated with winding 105-$k$, operation of the converter 120, 140 in full-bridge mode is facilitated by the relays $R_{k,1}$ and $R_{k,2}$ being closed while the relay $Y_k$ is open. For example, the secondary-side converter 140 at the secondary-side port 104-2 may be operated in full-bridge mode by closing relays $R_{3,1}$ and $R_{3,2}$ and opening relay $Y_3$. Similarly, closing relays $R_{1,1}$ and $R_{1,2}$ and opening relay $Y_1$ would result in the primary-side converter 120 operating in full-bridge mode.

Complementary setting of the relays would result in stacked half-bridge operation. That is, opening the relays $R_{k,1}$ and $R_{k,2}$ while closing the relay $Y_k$ would result in the corresponding converter 120, 140 operating in stacked half-bridge mode. As indicated the controller 110 may control the relays in addition to the converter switches.

Figure 3:
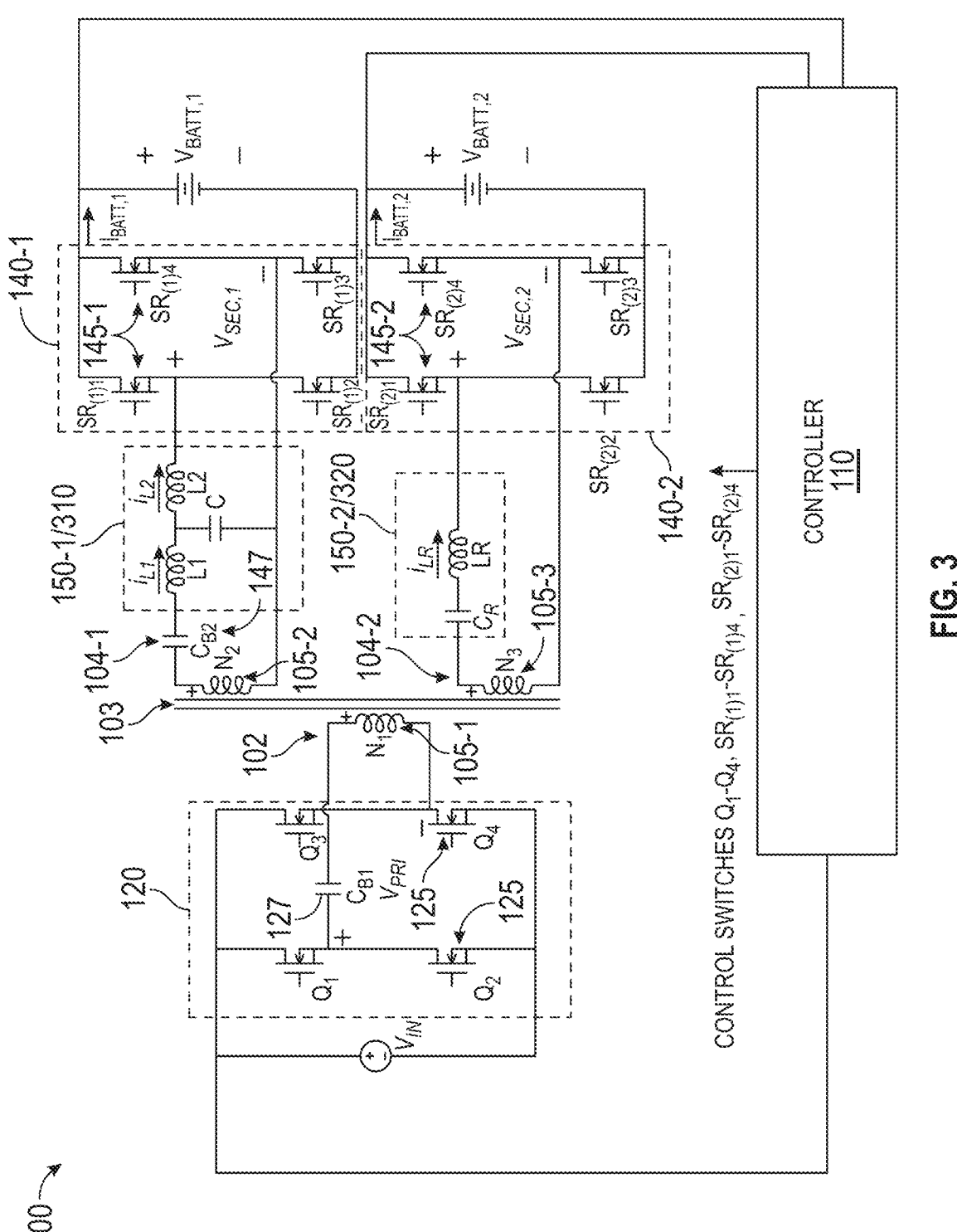
FIG. 3 is a circuit diagram of a three-port bidirectional DC-DC converter according to an exemplary embodiment.

FIG. 3 is a circuit diagram of a three-port bidirectional DC-DC converter 100 according to an exemplary embodiment. The exemplary embodiment shown in FIG. 3 includes a primary-side port 102 without a primary-side network 130 and secondary-side ports 104-1 and 104-2 with two different secondary-side networks 150-1 and 150-2. Specifically, the secondary-side network 150-1 that is associated with the secondary-side port 104-1 is an LCL-T network 310 with inductors $L_1$ and $L_2$ and capacitor C, and the secondary-side network 150-2 that is associated with the secondary-side port 104-2 is an SRC network 320 with a capacitor $C_R$ and an inductor $L_R$. The primary-side switches 125 $Q_1$-$Q_4$ and the secondary side switches 145, indicated as secondary-side switches 145-1 $SR_{(1)1}$-$SR_{(1)4}$ and 145-2 $SR_{(2)1}$-$SR_{(2)2}$, are shown.

While the exemplary embodiment shown in FIG. 3 is a three-port bidirectional DC-DC converter 100 shown with full-bridge converters 120, 140-1, and 140-2, the discussion of FIGS. 1 and 2 should make clear that the embodiment may be modified to include additional secondary-side ports 104 and, additionally or alternately, relays that facilitate disconnection of one or more ports 102, 104 or a dynamic change in operation of one or more converters 120, 140 from full-bridge mode to stacked half-bridge mode.

As previously noted, the exemplary three-port bidirectional DC-DC converter 100 may operate in one of the three exemplary modes of operation noted above or other modes (e.g., secondary-side port 104-2 supplies primary-side port 102 and/or secondary-side port 104-1). The three exemplary modes are further discussed with reference to FIGS. 4-6. The figures show positions of the switches 125, 145 $Q_1$-$Q_4$, $SR_{(1)1}$-$SR_{(1)4}$, and $SR_{(2)1}$-$SR_{(2)4}$. They also show the currents $i_{L1}$, $i_{L2}$, and $i_{LR}$ through inductors $L_1$, $L_2$, and $L_R$, respectively, and voltages at the converters 120, 140, indicated as $v_{pri}$, $v_{sec,1}$, and $v_{sec,2}$.

In the first exemplary mode of operation, the primary-side port 102 may supply each of the secondary-side ports 104. That is, the supply voltage $V_{IN}$ is used to control the output current $I_{BATT1}$ and output voltage $V_{BATT1}$ of the secondary-side port 104-1 and the output current $I_{BATT2}$ and output voltage $V_{BATT2}$ of the secondary-side port 104-2. In the second exemplary mode of operation, the secondary-side port 104-1 may supply both the primary-side port 102 and the other secondary-side port 104-2. In the third exemplary mode of operation, the switches $Q_1$-$Q_4$ of the primary-side converter 120 may be controlled to remain open while the secondary-side port 104-1 supplies the other secondary-side port 104-2.

The values of the inductors and capacitors may be selected to facilitate fixed frequency control of the switches $Q_1$-$Q_4$, $SR_{(1)1}$-$SR_{(1)4}$, and $SR_{(2)1}$-$SR_{(2)4}$. For the LCL-T network 310, the values are given by:

$$L_1 = L_2 = L \qquad \text{[EQ. 1]}$$

$$C = \frac{1}{4\pi^2 f s^2 L} \qquad \text{[EQ. 2]}$$

In EQ. 2, fs refers to the fixed switching frequency. For the SRC network 320, the values are given by:

$$L_R = \frac{1}{4\pi^2 f s^2 C_R} \qquad \text{[EQ. 3]}$$

$$Q = \frac{\sqrt{\frac{L_R}{C_R}}}{\frac{8V_{BATT2}}{\pi^2 I_{BATT2}}} \qquad \text{[EQ. 4]}$$

In EQ. 4, Q is a predefined quality factor of the secondary-side network 150-2. The SRC network 320 is designed to have zero impedance at the resonant frequency of the LCL-T network 310. Thus, during operation in the third exemplary mode of operation, power flow is according to the LCL-T network 310, as is the case for transfer from $V_{IN}$ to $V_{BATT1}$ in the first exemplary mode of operation.

Figure 4:
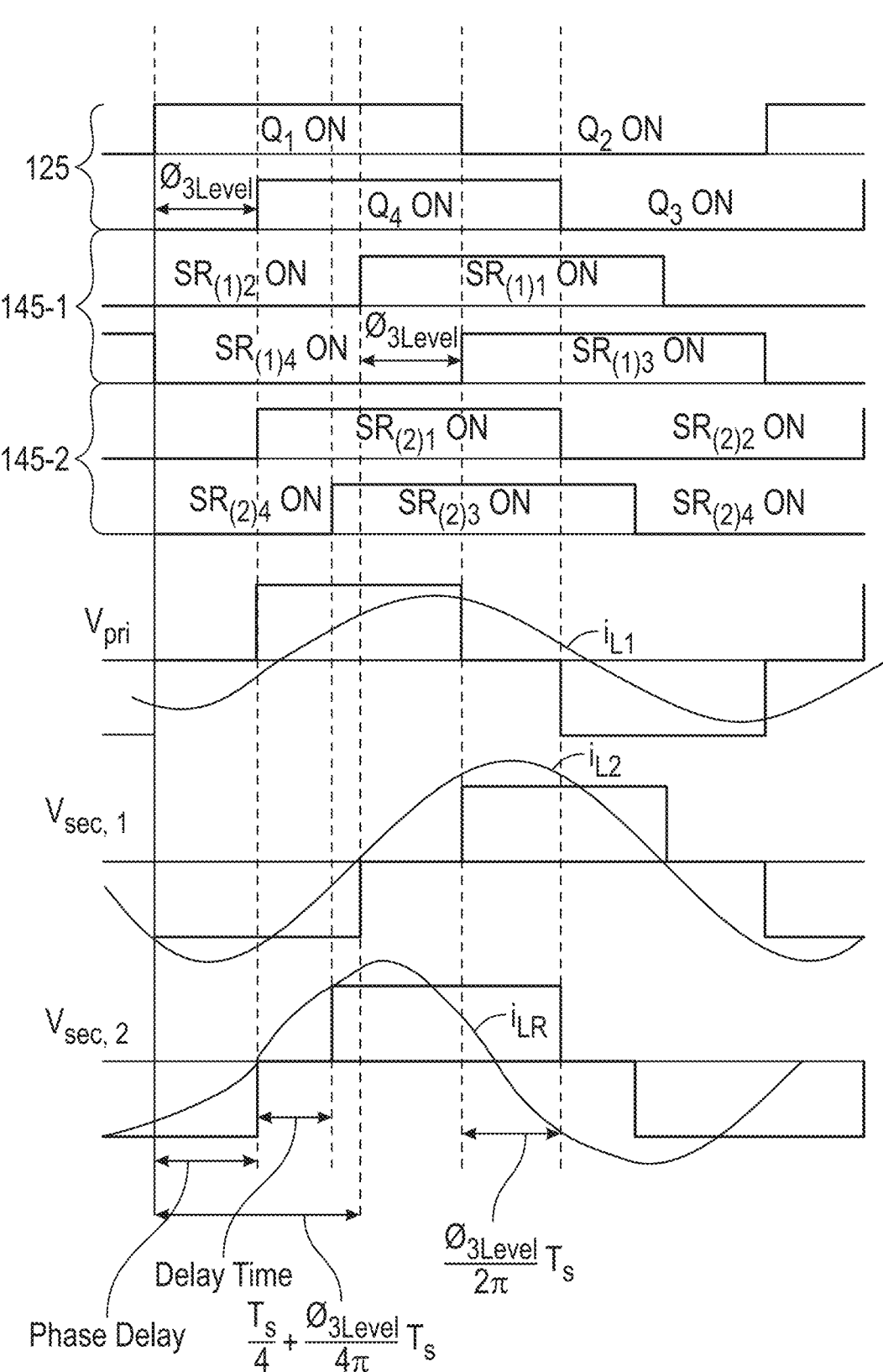
FIG. 4 is a timeline indicating switch positions and resulting voltages during a first exemplary mode of operation of the exemplary three-port bidirectional DC-DC converter of FIG. 3.

FIG. 4 is a timeline indicating switch positions and resulting voltages during the first exemplary mode of operation of the exemplary three-port bidirectional DC-DC converter 100 of FIG. 3. As previously noted, in the first exemplary mode of operation, the primary-side port 102. may supply power to both secondary-side ports 104-1 and 104-2. This mode may be referred to as a charging mode, for example, with the primary-side port 102 supplying power that originated at the grid.

FIG. 4 shows the position (on (closed) or off (open)) of each of the switches 125 $Q_1$-$Q_4$, 145-1 $SR_{(1)1}$-$SR_{(1)4}$, and 145-2 $SR_{(2)1}$-$SR_{(2)4}$ along with the currents $i_{L1}$, $i_{L2}$, and $i_{LR}$ through inductors $L_1$, $L_2$, and $L_R$, respectively, and voltages at the converters 120, 140-1, 140-2, indicated as $v_{pri}$, $v_{sec,1}$, and $v_{sec,2}$, respectively. Based on the secondary-side network 150-1 being the LCL-T network 310, the switches 125 $Q_1$-$Q_4$ can maintain ZVS based on power transferred to $V_{BATT,1}$ at the secondary-side port 104-1 without the need for frequency variation or magnetizing inductance. That is, a fixed switching frequency is possible.

The gate pulses operating the switches 125 $Q_1$-$Q_4$ and 145-1 $SR_{(1)1}$-$SR_{(1)4}$ are generated using control variable $\emptyset_{3level}$. This control variable $\emptyset_{3level}$ is the interval between turn on of switch pairs $Q_1$ and $Q_4$, $Q_2$ and $Q_3$, $SR_{(1)1}$ and SR(1)3, and SR(1)2 and $SR_{(1)4}$, as indicated. As indicated in FIG. 4, the delay between turn on of switch $Q_1$ and switch $SR_{(1)1}$ (and between turn on of switch $Q_2$ and switch SR(1)3) is a controllable phase shift of $$T_s/4 + \frac{\emptyset_{3level}}{4\pi} T_s.$$

Thus, between the primary-side port 102 and the secondary-side port 104-1, the switches 125, 145-1 are subject to fixed frequency phase shift control.

At the secondary port 104-2, which has a secondary-side network 150-2 that is an SRC network 320, a variable delay time, indicated as "Delay Time," is used to generate the gate pulses operating the switches 145-2 $SR_{(2)1}$-$SR_{(2)4}$. Delay time is the interval by which turn on time for switch SR(2)3 is delayed from the zero crossing of the current $i_{LR}$ that flows through the inductor $L_R$ of the SRC network 320. During this interval, the windings 105-3 get shorted, providing voltage boosting capability for the SR network 320. Thus, the duration of the interval controls the gain of the converter at the secondary-side port 104-2. Put another way, the voltage $V_{BATT,2}$ at the secondary-side port 104-2 may be controlled by controlling the delay time.

Figure 5:
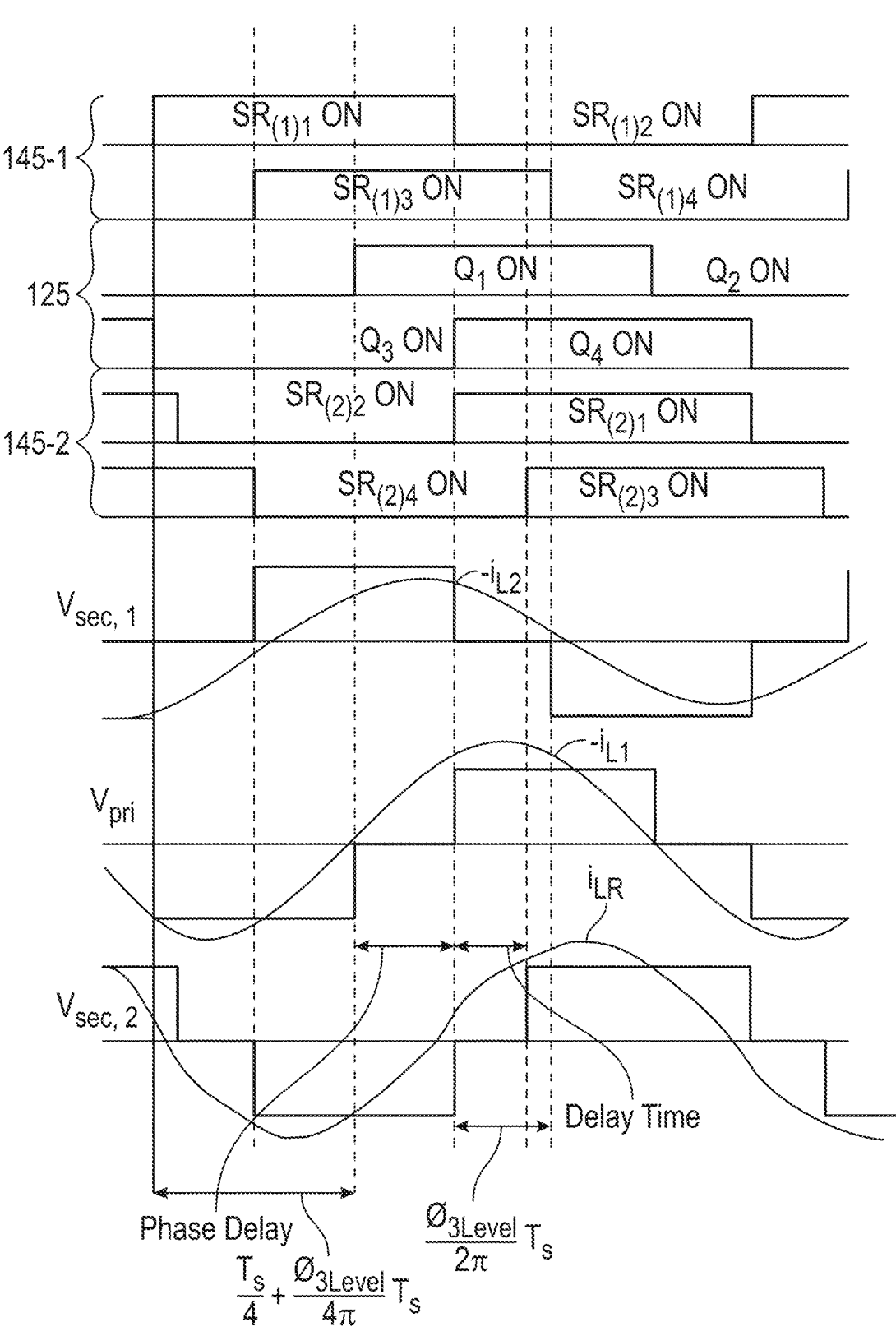
FIG. 5 is a timeline indicating switch positions and resulting voltages during a second exemplary mode of operation of the exemplary three-port bidirectional DC-DC converter of FIG. 3.

FIG. 5 is a timeline indicating switch positions and resulting voltages during the second exemplary mode of operation of the exemplary three-port bidirectional DC-DC converter 100 of FIG. 3. As previously noted, in the second exemplary mode of operation, the secondary-side port 104-1 may supply power to the primary-side port 102 and the secondary-side port 104-2. This mode may be referred to as a discharging mode, for example, because the battery $V_{BATT,1}$ of the primary-side port 104-1 that was previously charged may discharge in this mode to supply other ports.

FIG. 5 shows the position (on (closed) or off (open)) of each of the switches 145-1 $SR_{(1)1}$-$SR_{(1)4}$, 125 $Q_1$-$Q_4$, and 145-2 $SR_{(2)1}$-SR(2) along with the currents $-i_{L2}$, $-i_{L1}$, and $i_{LR}$ through inductors $L_2$, $L_1$, and $L_R$, respectively, and voltages at the converters 140-1, 120, 140-2, indicated as $v_{sec,1}$, $v_{pri}$, and $v_{sec,2}$, respectively. As FIG. 5 indicates, the switches 145-1 $SR_{(1)1}$-SR(1) are operated first and the controllable phase shift $\emptyset_{3level}$ is applied again between switch pairs $Q_1$ and $Q_4$, $Q_2$ and $Q_3$, $SR_{(1)1}$ and SR(1)3, and SR(1)2 and $SR_{(1)4}$.

That is, between the secondary-side port 104-1 and the primary-side port 102, the switches 145-1, 125 are subject to fixed frequency phase shift control. Further, as in the first exemplary mode discussed with reference to FIG. 4, power of the secondary-side port 104-2 (i.e., at $V_{BATT,2}$) is still regulated using the delay time from the zero crossing of the current $i_{LR}$ that flows through the inductor $L_R$ of the SRC network 320 at the secondary-side port 104-2.

Figure 6:
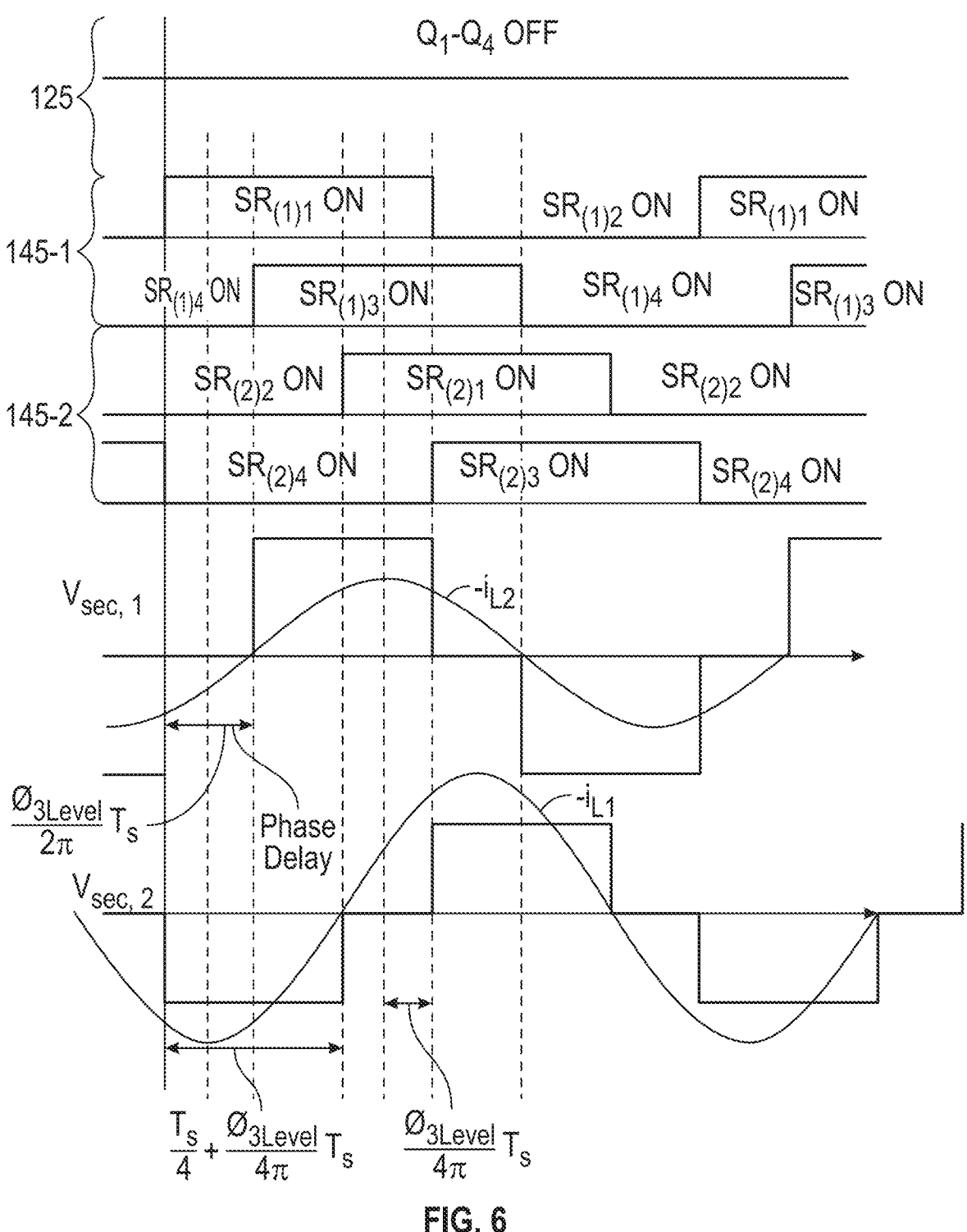
FIG. 6 is a timeline indicating switch positions and resulting voltages during a third exemplary mode of operation of the exemplary three-port bidirectional DC-DC converter of FIG. 3.

FIG. 6 is a timeline indicating switch positions and resulting voltages during the third exemplary mode of operation of the exemplary three-port bidirectional DC-DC converter 100 of FIG. 3. As previously noted, in the third exemplary mode of operation, the secondary-side port 104-1 may supply power to only the secondary-side port 104-2 while the primary-side switches 125 $Q_1$-$Q_4$ are all off. This mode of operation may be used within an EV, for example.

FIG. 6 shows the position (on (closed) or off (open)) of each of the switches 125 $Q_1$-$Q_4$, 145-1 $SR_{(1)1}$-$SR_{(1)4}$, and 145-2 $SR_{(2)1}$-$SR_{(2)4}$ along with the currents $-i_{L2}$ and $-i_{L1}$ through inductors $L_2$ and $L_1$, respectively, and voltages at the converters 140-1 and 140-2, indicated as $v_{sec,1}$ and $v_{sec,2}$, respectively. Because the primary-side switches 125 $Q_1$-$Q_4$ are all off, power transfer from the secondary-side port 104-1 to the secondary-side port 104-2 results in the exemplary three-port bidirectional DC-DC converter 100 of FIG. 3 behaving like an LCL-T resonant converter. Thus, as FIG.

6 indicates, the switches 145-1 and 145-2 are operated with fixed frequency phase shift control with a controllable phase shift of $$T_s / 4 + \frac{\mathcal{O}_{3level}}{4\pi} T_s.$$

In a different exemplary mode of operation, in which the secondary-side port 104-2 supplies only the secondary-side port 104-1, the operation of the switches 145-1 and 145-2 shown in FIG. 6 would be interchanged. That is, operation of switches 145-2 would lead the operation of switches 145-1. However, the same fixed switching frequency would be employed with a controllable phase shift of $$T_s / 4 + \frac{\mathcal{O}_{3level}}{4\pi} T_s.$$

Figure 7:
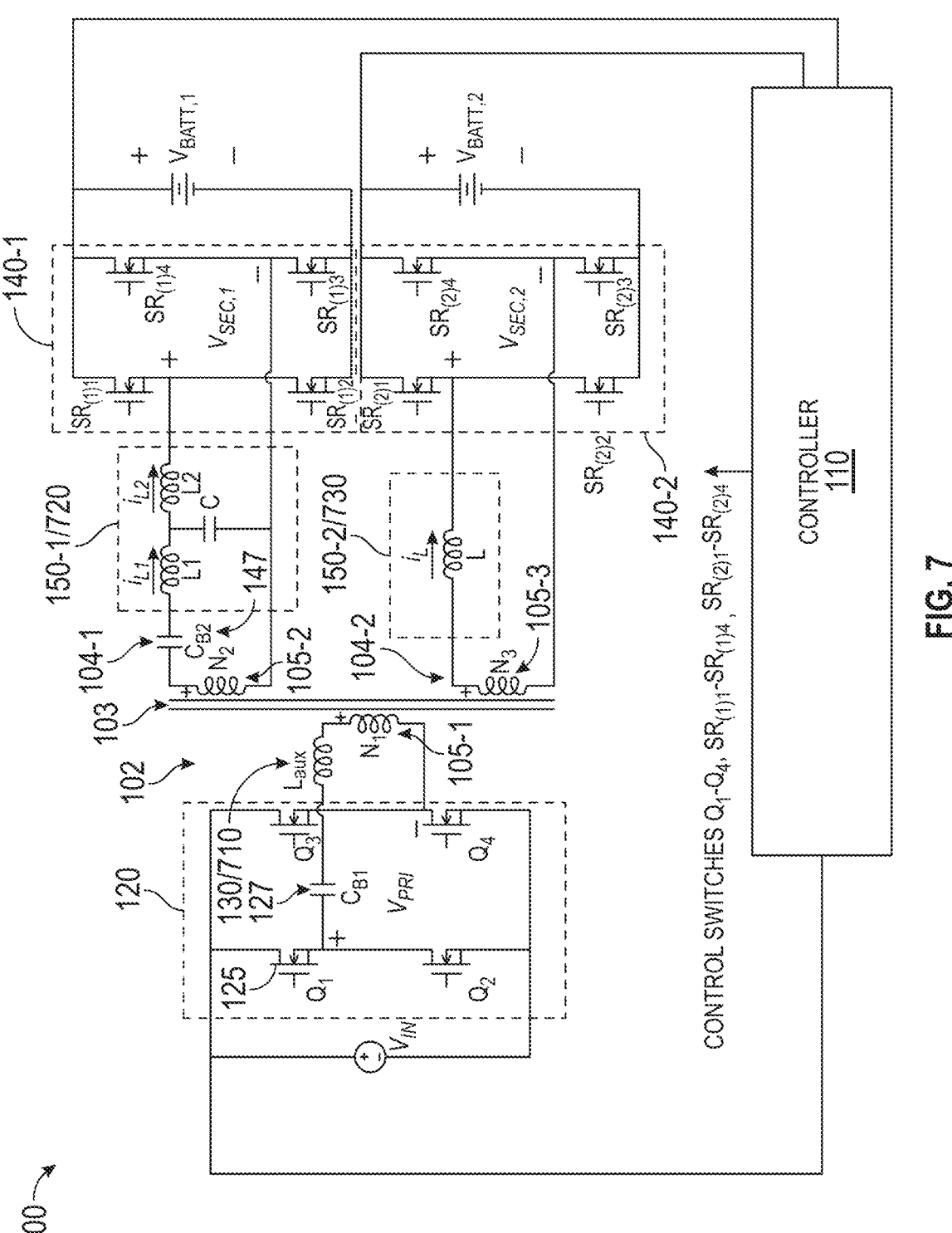
FIG. 7 is a circuit diagram of a three-port bidirectional DC-DC converter according to an exemplary embodiment.

FIG. 7 is a circuit diagram of a three-port bidirectional DC-DC converter 100 according to an exemplary embodiment. The exemplary embodiment shown in FIG. 7 includes a primary-side port 102 with a primary-side network 130 of a resonant inductor Laux 710 and secondary-side ports 104-1 and 104-2 with two different secondary-side networks 150-1 and 150-2. Specifically, the secondary-side network 150-1 that is associated with the secondary-side port 104-1 is an LCL-T network 720 with inductors $L_1$ and $L_2$ and capacitor C, and the secondary-side network 150-2 that is associated with the secondary-side port 104-2 is an energy transfer inductor 730 (L) such that the exemplary converter 140-2 is a dual active bridge (DAB) converter.

Like the exemplary embodiment shown in FIG. 3, the exemplary embodiment shown in FIG. 7 is a three-port bidirectional DC-DC converter 100 shown with full-bridge converters 120, 140-1, and 140-2. However, the discussion of FIGS. 1 and 2 should make clear that the embodiment may be modified to include additional secondary-side ports 104 and, additionally or alternately, relays $S_1$-$S_3$, $R_{1,1}$ and $R_{1,2}$ to $R_{3,1}$ and $R_{3,2}$, and $Y_1$ to $Y_3$ that facilitate disconnection of one or more ports 102, 104 or a dynamic change in operation of one or more converters 120, 140 from full-bridge mode to stacked half-bridge mode.

As previously noted, the exemplary three-port bidirectional DC-DC converter 100 may operate in one of the three exemplary modes of operation described above or other modes (e.g., secondary-side port 104-2 supplies primary-side port 102 and/or secondary-side port 104-1). The modes are further discussed with reference to FIGS. 8-10. The figures show switches 125 $Q_1$-$Q_4$, 145-1 $SR_{(1)1}$-$SR_{(1)4}$, and 145-2 $SR_{(2)1}$-$SR_{(2)4}$. They also show the currents $i_{L1}$, $i_{L2}$, and $i_L$ through inductors $L_1$, $L_2$, and L, respectively, and voltages at the converters 120, 140-1, and 140-2, indicated as $v_{pri}$, $v_{sec,1}$, and $v_{sec,2}$, respectively.

In the first exemplary mode of operation, the primary-side port 102 may supply each of the secondary-side ports 104. That is, the supply voltage $V_{IN}$ is used to control the output current $I_{BATT1}$ and output voltage $V_{BATT1}$ of the secondary-side port 104-1 and the output current $I_{BATT2}$ and output voltage $V_{BATT2}$ of the secondary-side port 104-2. In the second exemplary mode of operation, the secondary-side port 104-1 may supply both the primary-side port 102 and the other secondary-side port 104-2. In the third exemplary mode of operation, the switches $Q_1$-$Q_4$ of the primary-side converter 120 may be controlled to remain open while the secondary-side port 104-1 supplies the other secondary-side port 104-2.

The values of the inductors and capacitors may be selected to facilitate fixed frequency control of the switches $Q_1$-$Q_4$, $SR_{(1)1}$-$SR_{(1)4}$, and $SR_{(2)1}$-$SR_{(2)4}$. The values are given by:

$$L_2 = L_1 + L \frac{N_2^2}{N_3^2} \qquad \text{[EQ. 5]}$$

$$C = \frac{1}{4\pi^2 fs^2 L_2} \qquad \text{[EQ. 6]}$$

$$L_{aux} = L \frac{N_1^2}{N_3^2} \qquad \text{[EQ. 7]}$$

As previously noted, $N_2$ and $N_3$ are the number of turns for the windings 105-2 and 105-3, respectively. The resonant inductor $L_{aux}$ 710 compensates for the fact that the energy transfer inductor 730 (L) does not exhibit zero impedance at the resonant frequency of the LCL-T network 720 (unlike the SRC network 320 in FIG. 3).

Figure 8:
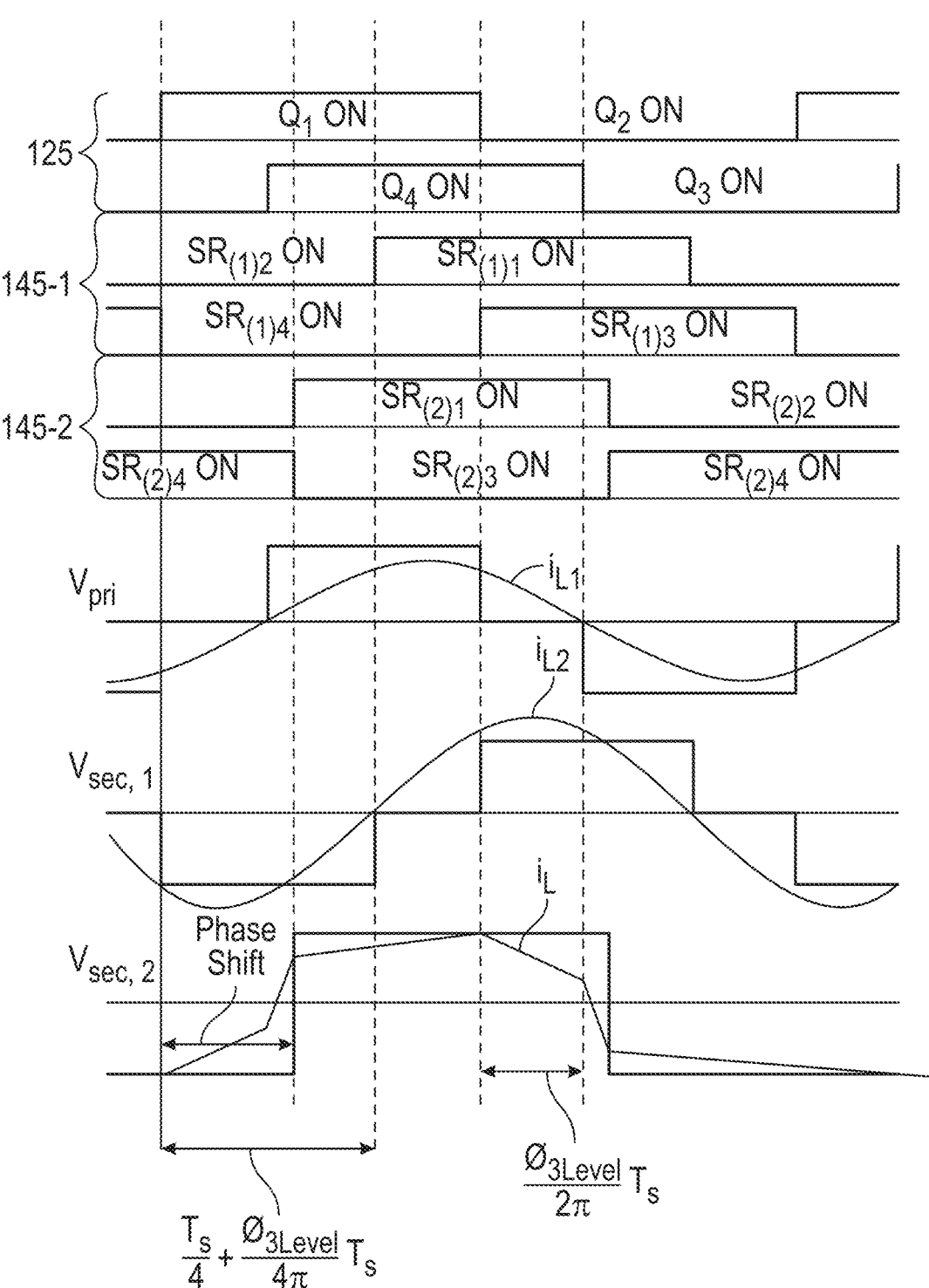
FIG. 8 is a timeline indicating switch positions and resulting voltages during a first exemplary mode of operation of the exemplary three-port bidirectional DC-DC converter of FIG. 7.

FIG. 8 is a timeline indicating switch positions and resulting voltages during the first exemplary mode of operation of the exemplary three-port bidirectional DC-DC converter 100 of FIG. 7. As previously noted, in the first exemplary mode of operation, the primary-side port 102 may supply power to both secondary-side ports 104-1 and 104-2. This mode may be referred to as a charging mode, for example, with the primary-side port 102 supplying power that originated at the grid.

FIG. 8 shows the position (on (closed) or off (open)) of each of the switches 125 $Q_1$-$Q_4$, 145-1 $SR_{(1)1}$-$SR_{(1)4}$, and 145-2 $SR_{(2)1}$-$SR_{(2)4}$ along with the currents $i_{L1}$, $i_{L2}$, and $i_L$ through inductors $L_1$, $L_2$, and L, respectively, and voltages at the converters 120, 140-1, 140-2, indicated as $v_{pri}$, $v_{sec,1}$, and $v_{sec,2}$, respectively. As noted with reference to FIG. 4, based on the secondary-side network 150-2 being the LCL-T network 310, the switches 125 $Q_1$-$Q_4$ can maintain ZVS based on power transferred to $V_{BATT,1}$ at the secondary-side port 104-1 without the need for frequency variation or magnetizing inductance. That is, a fixed switching frequency control is possible.

The gate pulses operating the switches 125 $Q_1$-$Q_4$ and 145-1 $SR_{(1)1}$-$SR_{(1)4}$ are generated using control variable $\mathcal{O}_{3level}$. This control variable $\mathcal{O}_{3level}$ is the interval between turn on of switch pairs $Q_1$ and $Q_4$, $Q_2$ and $Q_3$, $SR_{(1)1}$ and $SR_{(1)3}$, and $SR_{(1)2}$ and $SR_{(1)4}$, as indicated. As indicated in FIG. 4, the delay between turn on of switch $Q_1$ and switch $SR_{(1)1}$ (and between turn on of switch $Q_2$ and switch $SR_{(1)3}$) is a controllable phase shift of $$T_s / 4 + \frac{\mathcal{O}_{3level}}{4\pi} T_s.$$

Thus, between the primary-side port 102 and the secondary-side port 104-1, the switches 125, 145-1 are subject to fixed frequency phase shift control.

At the secondary port 104-2, which has a secondary-side network 150-2 that includes the energy transfer inductor 730 (L), the control variable for the DAB stage is a phase shift indicated as "Phase shift" between turn on of switch 125 $Q_1$ and turn on of switch 145-2 $SR_{(2)1}$. The presence of the resonant inductor $L_{aux}$ may couple the power flow between $V_{BATT,1}$ and $V_{BATT,2}$ to some extent. The value of the resonant inductor $L_{aux}$ may be kept small to minimize the coupling even though independent control of $V_{BATT,1}$ and $V_{BATT,2}$ is still possible using the two different control variables, $\varnothing_{3level}$ and the phase shift.

Figure 9:
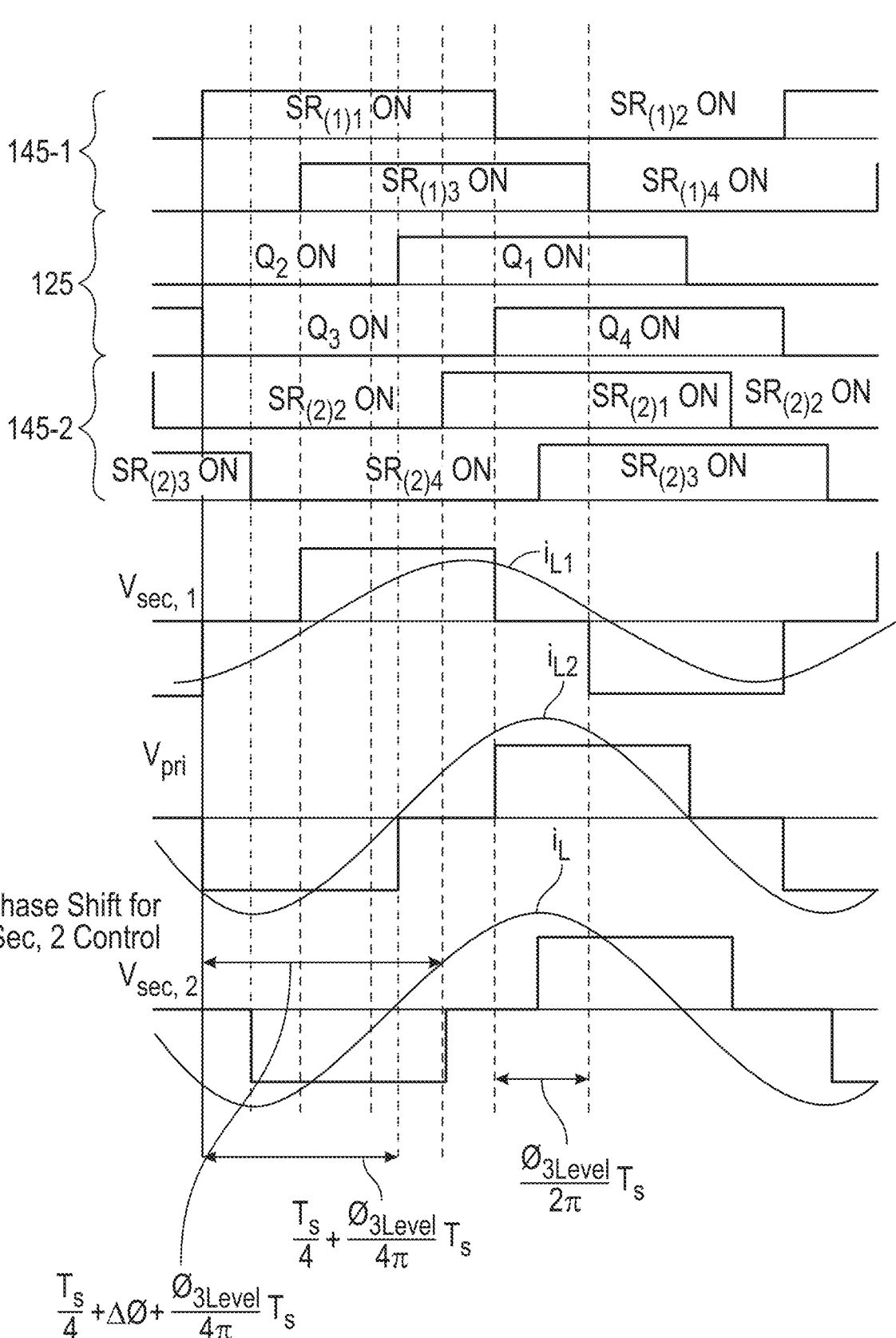
FIG. 9 is a timeline indicating switch positions and resulting voltages during a second exemplary mode of operation of the exemplary three-port bidirectional DC-DC converter of FIG. 7.

FIG. 9 is a timeline indicating switch positions and resulting voltages during the second exemplary mode of operation of the exemplary three-port bidirectional DC-DC converter 100 of FIG. 7. As previously noted, in the second exemplary mode of operation, the secondary-side port 104-1 may supply power to the primary-side port 102 and the secondary-side port 104-2. This mode may be referred to as a discharging mode, for example, because the battery $V_{BATT,1}$ of the primary-side port 104-1 that was previously charged may discharge in this mode.

FIG. 9 shows the position (on (closed) or off (open)) of each of the switches 145-1 $SR_{(1)1}$-$SR_{(1)4}$, 125 $Q_1$-$Q_4$, and 145-2 $SR_{(2)1}$-$SR_{(2)4}$ along with the currents $i_{L1}$, $i_{L2}$, and $i_L$ through inductors $L_1$, $L_2$, and $L$, respectively, and voltages at the converters 140-1, 120, 140-2, indicated as $v_{sec,1}$, $v_{pri}$, and $v_{sec,2}$, respectively. As FIG. 9 indicates, the switches 145-1 $SR_{(1)1}$-$SR_{(1)4}$ are operated first and the controllable phase shift $\varnothing_{3level}$ is applied again between switch pairs $Q_1$ and $Q_4$, $Q_2$ and $Q_3$, $SR_{(1)1}$ and $SR_{(1)3}$, and $SR_{(1)2}$ and $SR_{(1)4}$.

That is, between the secondary-side port 104-1 and the primary-side port 102, the switches 145-1, 125 are subject to fixed frequency phase shift control. Unlike during operation in the second exemplary mode, discussed with reference to FIG. 5, the primary side inductor 130 $L_{aux}$ forms one equivalent LCL-T network with the secondary-side network 150-1 and the secondary-side inductor 150-2 L forms another equivalent LCL-T network with secondary-side network 150-1 for the exemplary embodiment of FIG. 7. That is, $\varnothing_{3level}$ is the control variable to regulate power flow from the secondary-side port 104-1 to the primary-side port 102, whereas an additional phase-shift $\Delta\varnothing$ may be used to regulate power flow from the secondary-side port 104-1 to the secondary-side port 104-2. Specifically, as shown, a phase shift of $$T_s/4 + \frac{\varnothing_{3level}}{4\pi}T_s$$

is used between the secondary-side port 104-1 and the primary-side port 102, and a phase shift of $$T_s/4 + \Delta\varnothing + \frac{\varnothing_{3level}}{4\pi}T_s$$

is used between the secondary-side port 104-1 and secondary-side port 104-2.

Figure 10:
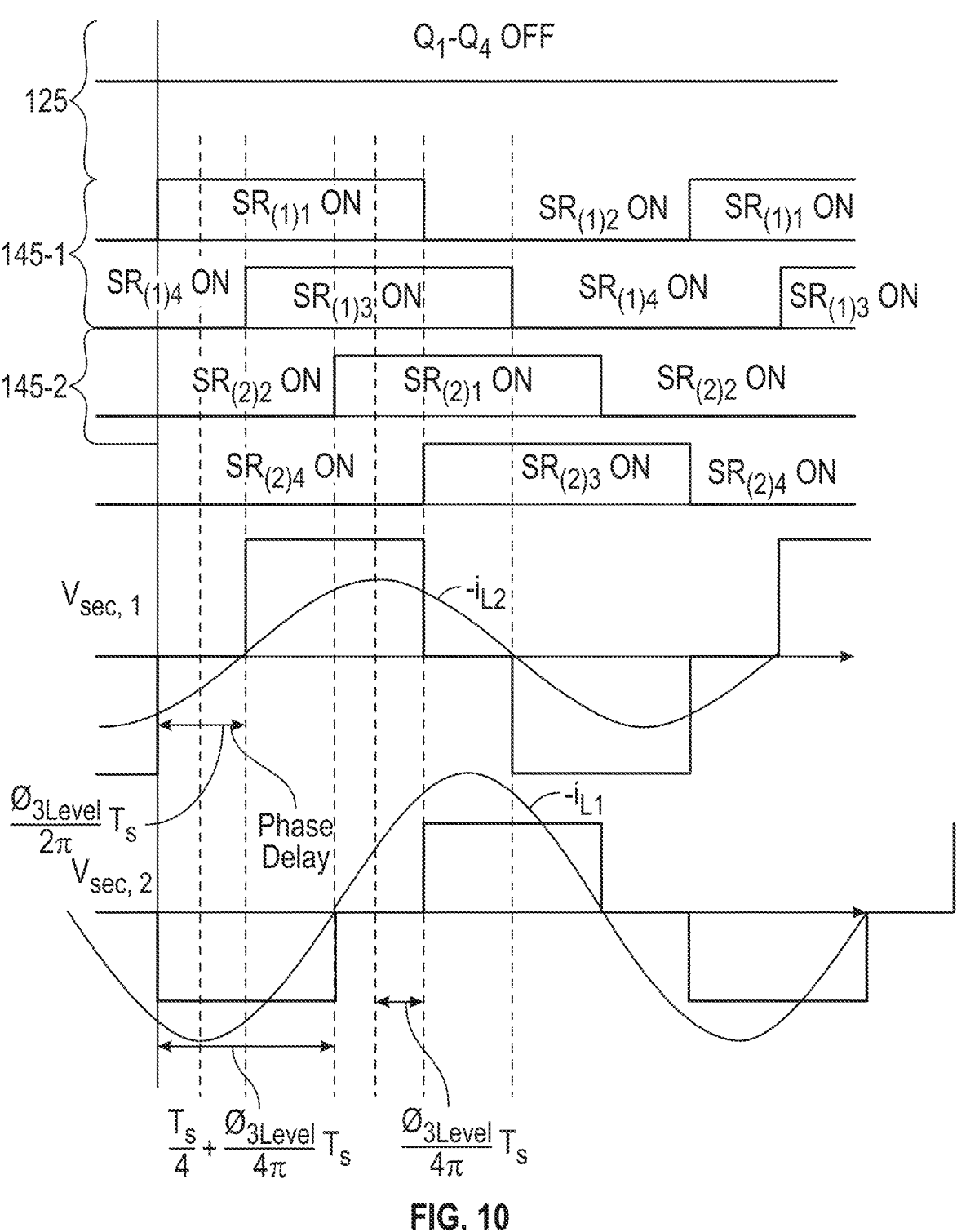
FIG. 10 is a timeline indicating switch positions and resulting voltages during a third exemplary mode of operation of the exemplary three-port bidirectional DC-DC converter of FIG. 7.

FIG. 10 is a timeline indicating switch positions and resulting voltages during the third exemplary mode of operation of the exemplary three-port bidirectional DC-DC converter 100 of FIG. 7. As previously noted, in the third exemplary mode of operation, the secondary-side port 104-1 may supply power to only the secondary-side port 104-2 while the primary-side switches 125 $Q_1$-$Q_4$ are all off. This mode of operation may be used within an EV, for example.

FIG. 10 shows the position (on (closed) or off (open)) of each of the switches 125 $Q_1$-$Q_4$, 145-1 $SR_{(1)1}$-$SR_{(1)4}$, and 145-2 $SR_{(2)1}$-$SR_{(2)4}$ along with the currents $-i_{L2}$ and $-i_{L1}$ of inductors $L_2$ and $L_1$, respectively, and voltages at the converters 140-1, 140-2, indicated as $v_{sec,1}$ and $v_{sec,2}$, respectively. Because the primary-side switches 125 $Q_1$-$Q_4$ are all off, power transfer from the secondary-side port 104-1 to the secondary-side port 104-2 results in the exemplary three-port bidirectional DC-DC converter 100 of FIG. 7 behaving like an LCL-T resonant converter. Thus, as FIG. 10 indicates, the switches 145-1 and 145-2 are operated with fixed frequency phase shift control with a controllable phase shift of $$T_s/4 + \frac{\varnothing_{3level}}{4\pi}T_s.$$

Figure 11:
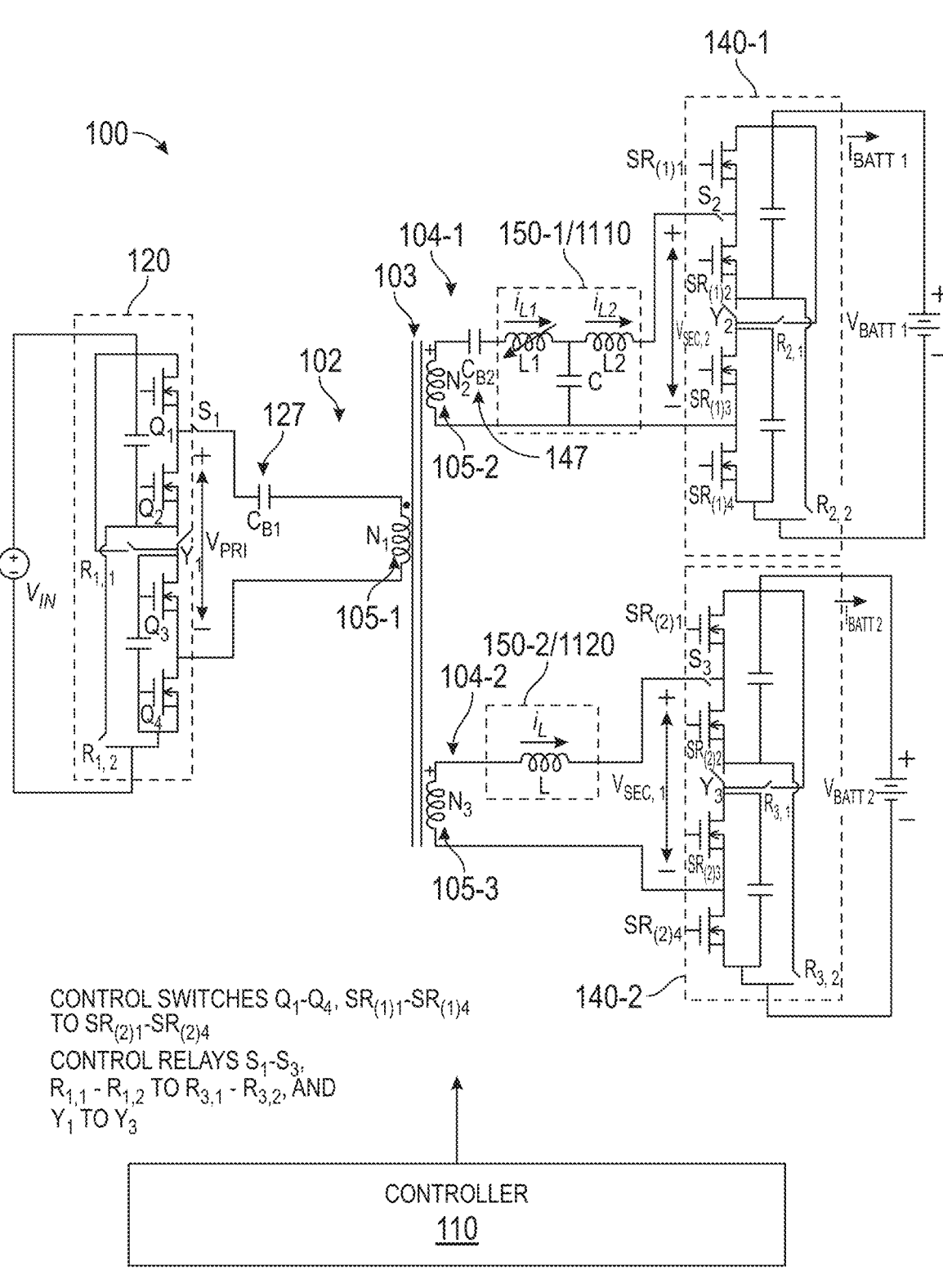
FIG. 11 is a circuit diagram of an alternate embodiment of the three-port bidirectional DC-DC converter of FIG. 7.

FIG. 11 is a circuit diagram of a three-port bidirectional DC-DC converter 100 according to an exemplary embodiment. The exemplary embodiment shown in FIG. 11 is an alternate embodiment to that shown in FIG. 7 and includes a primary-side port 102 without a primary-side network 130 and secondary-side ports 104-1 and 104-2 with two different secondary-side networks 150-1 and 150-2. The secondary-side network 150-1 that is associated with the secondary-side port 104-1 is an LCL-T network 1110 with inductors $L_1$ and $L_2$ and capacitor C, and the secondary-side network 150-2 that is associated with the secondary-side port 104-2 is an energy transfer inductor 1120 (L) resulting in the converter 140-2 being a dual active bridge (DAB) converter in the first exemplary mode of operation. The inductor $L_1$ has a variable inductance and facilitates omitting the resonant inductor $L_{aux}$ 710 at the primary-side port 102 that is shown in FIG. 7.

Unlike the exemplary embodiments shown in FIGS. 3 and 7, which are shown with full-bridge converters 120, 140-1, and 140-2, the exemplary embodiment shown in FIG. 11 includes relays $S_1$-$S_3$, $R_{1,1}$ through $R_{1,4}$-$R_{3,1}$ through $R_{3,4}$, and $Y_1$-$Y_3$, similar to those discussed with reference to FIG. 2, that facilitate disconnection of one or more ports 102, 104 or a dynamic change in operation of one or more converters 120, 140 between full-bridge mode and stacked half-bridge mode.

As discussed with reference to FIG. 7, the exemplary embodiment shown in FIG. 11 may be operated in one of the three exemplary modes of operation discussed above or other modes (e.g., secondary-side port 104-2 supplies primary-side port 102 and/or secondary-side port 104-1). In the first exemplary mode of operation, the primary-side port 102 may supply each of the secondary-side ports 104. That is, the supply voltage $V_{IN}$ is used to control the output current $I_{BATT1}$ and output voltage $V_{BATT1}$ of the secondary-side port 104-1 and the output current $I_{BATT2}$ and output voltage $V_{BATT2}$ of the secondary-side port 104-2. In the second exemplary mode of operation, the secondary-side port 104-1 may supply both the primary-side port 102 and the other secondary-side port 104-2. In the third exemplary mode of operation, the switches $Q_1$-$Q_4$ of the primary-side converter 120 may be controlled to remain open while the secondary-side port 104-1 supplies the other secondary-side port 104-2.

As noted, the variable inductor $L_1$ facilitates omission of the resonant inductor $L_{aux}$ 710 from the embodiment shown in FIG. 7. The variable inductor $L_1$ may produce two discrete inductance values based on the mode of operation. During the first and second exemplary modes of operation, for example, the value of $L_1$ may be equal to the value of $L_2$ (according to EQ. 1) and during the third exemplary mode of operation, the value of $L_1$ may be in accordance with EQ.

5. This allows the secondary-side converter 140-2 to be controlled as a DAB converter during power flow from port 104-1 to port 104-2.

Figure 12:
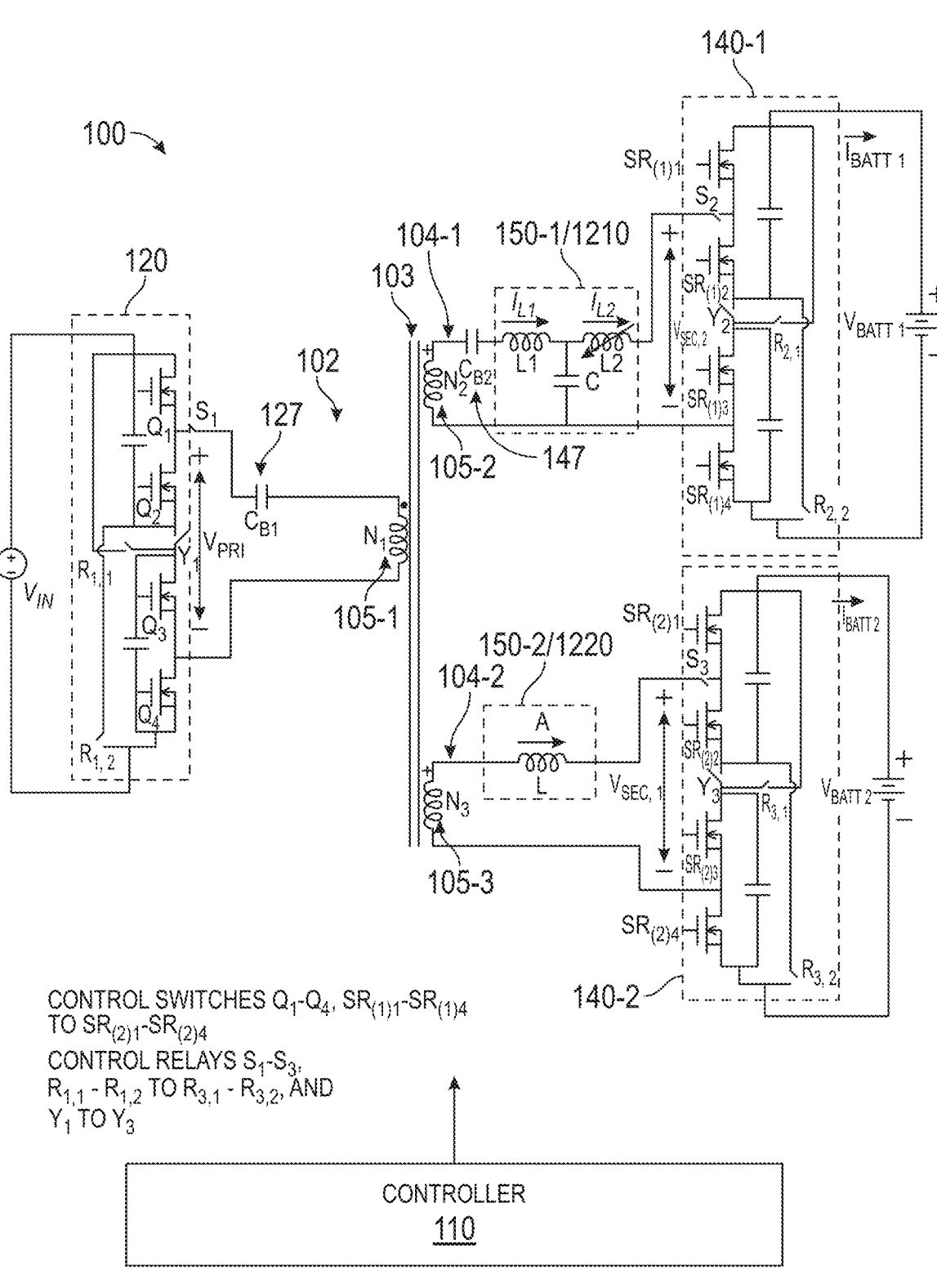
FIG. 12 is a circuit diagram of an alternate embodiment of the three-port bidirectional DC-DC converter of FIG. 7.

FIG. 12 is a circuit diagram of a three-port bidirectional DC-DC converter 100 according to an exemplary embodiment. The exemplary embodiment shown in FIG. 12 is an alternate embodiment to that shown in FIG. 7 (and FIG. 11) and includes a primary-side port 102 without a primary-side network 130 and secondary-side ports 104-1 and 104-2 with two different secondary-side networks 150-1 and 150-2. The secondary-side network 150-1 that is associated with the secondary-side port 104-1 is an LCL-T network 1210 with inductors $L_1$ and $L_2$ and capacitor C, and the secondary-side network 150-2 that is associated with the secondary-side port 104-2 is an energy transfer inductor 1220 (L) resulting in the converter 140-2 being a dual active bridge (DAB) converter in the first exemplary mode of operation. The inductor $L_2$ has a variable inductance and facilitates omitting the resonant inductor $L_{aux}$ 710 at the primary-side port 102 that is shown in FIG. 7.

Unlike the exemplary embodiments shown in FIGS. 3 and 7, which are shown with full-bridge converters 120, 140-1, and 140-2, the exemplary embodiment shown in FIG. 12, like the illustration in FIG. 11, includes relays $S_1$-$S_3$, $R_{1,1}$ through $R_{1,4}$-$R_{3,1}$ through $R_{3,4}$, and $Y_1$-$Y_3$, similar to those discussed with reference to FIG. 2, that facilitate disconnection of one or more ports 102, 104 or a dynamic change in operation of one or more converters 120, 140 between full-bridge mode and stacked half-bridge mode.

As discussed with reference to FIG. 7, the exemplary embodiment shown in FIG. 12 may be operated in one of the three exemplary modes of operation discussed above or other modes (e.g., secondary-side port 104-2 supplies primary-side port 102 and/or secondary-side port 104-1). In a first mode, the primary-side port 102 may supply each of the secondary-side ports 104. That is, the supply voltage $V_{IN}$ is used to control the output current $I_{BATT1}$ and output voltage $V_{BATT1}$ of the secondary-side port 104-1 and the output current $I_{BATT2}$ and output voltage $V_{BATT2}$ of the secondary-side port 104-2. In a second mode, the secondary-side port 104-1 may supply both the primary-side port 102 and the other secondary-side port 104-2. In a third mode, the switches $Q_1$-$Q_4$ of the primary-side converter 120 may be controlled to remain open while the secondary-side port 104-1 supplies the other secondary-side port 104-2.

As noted, the variable inductor $L_2$ facilitates omission of the resonant inductor $L_{aux}$ 710 from the embodiment shown in FIG. 7. The variable inductor $L_2$ may produce two discrete inductance values based on the mode of operation. During the first and second modes of operation, the value of $L_1$ may be equal to the value of $L_2$ (according to EQ. 1) and the fixed switching frequency may be in accordance with EQ. 6 or:

$$f_s = \frac{1}{2\pi\sqrt{L_1 C}} \qquad \text{[EQ. 8]}$$

During the first and second exemplary modes of operation, power is transferred from port primary port 102 and secondary port 104-1, respectively, to secondary port 104-2 with DAB operation. During the third exemplary mode of operation, the value of $L_2$ may be in accordance with EQ. 5 and the fixed switching frequency may be given by:

$$f_s = \frac{1}{2\pi\sqrt{\left(L_1 + L\frac{N_2^2}{N_3^2}\right)C}} \qquad \text{[EQ. 9]}$$

This allows the secondary-side converter 140-2 to be controlled equivalently as an LCL-T converter during power flow from secondary port 104-1 to secondary port 104-2.

Figure 13:
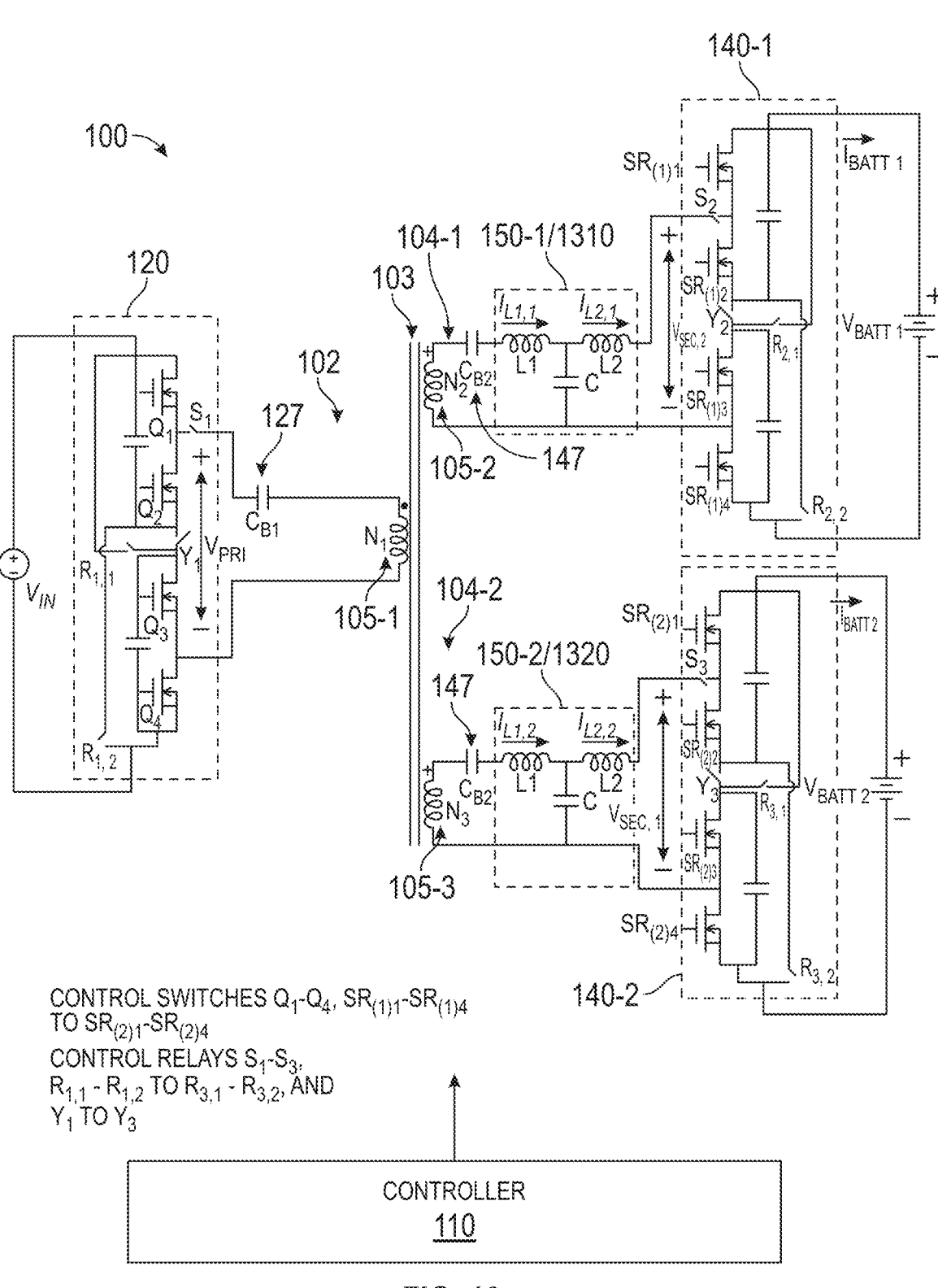
FIG. 13 is a circuit diagram of a three-port bidirectional DC-DC converter according to an exemplary embodiment.

FIG. 13 is a circuit diagram of a three-port bidirectional DC-DC converter 100 according to an exemplary embodiment. The exemplary embodiment shown in FIG. 13 includes a primary-side port 102 without a primary-side network 130 and secondary-side ports 104-1 and 104-2 with the same secondary-side network 150-1 and 150-2. Specifically, the secondary-side networks 150-1 and 150-2 are LCL-T networks 1310 and 1320 with inductors $L_1$ and $L_2$ and capacitor C.

In the exemplary embodiment of FIG. 13, not only is $L_1$ the same value as $L_2$, but that value is the same for both secondary-side networks 150-1 and 150-2. In addition, the number of turns $N_2$ is the same for both the secondary-side windings 105-2 and 105-3 at both secondary-side ports 104-1 and 104-2. However, in alternate embodiments, the values of $L_1$ and $L_2$ in the LCL-T network 1310 need not be the same as those in the LCL-T network 1320 and the number of turns $N_2$ need not be the same at the secondary-side ports 104-1 and 104-2.

The exemplary circuit of FIG. 13 is shown with relays $S_1$-$S_3$, $R_{1,1}$ and $R_{1,2}$ to $R_{3,1}$ and $R_{3,2}$, and $Y_1$ to $Y_3$ that facilitate connection of the half-bridges in parallel or in series, as also shown in the exemplary embodiments of FIGS. 11 and 12. Thus, the exemplary embodiment of FIG. 13 facilitates dynamically switching between a voltage-doubler or current-doubler mode. In addition, disconnection of one or more ports 102, 104 is facilitated. However, in alternate embodiments, one or more ports 102, 104 may have full-bridge converters 120, 140, in accordance with the example shown in FIGS. 3 and 7.

As previously noted, the exemplary three-port bidirectional DC-DC converter 100 may operate in one of the three exemplary modes of operation discussed above or other modes (e.g., secondary-side port 104-2 supplies primary-side port 102 and/or secondary-side port 104-1). The three exemplary modes are further discussed with reference to FIGS. 14-16. The figures show switches 125 $Q_1$-$Q_4$, 145-1 $SR_{(1)1}$-$SR_{(1)4}$, and 145-2 $SR_{(2)1}$-$SR_{(2)4}$. They also show the currents $i_{L1,1}$ and $i_{L2,1}$, through $L_1$ and $L_2$, respectively, of the LCL-T network 1310 and $i_{L1,2}$ and $i_{L2,2}$, through $L_1$ and $L_2$, respectively, of the LCL-T network 1320, as well as voltages at the converters 120, 140-1 and 140-2, indicated as $v_{pri}$, $v_{sec,1}$, and $v_{sec,2}$, respectively.

In the first exemplary mode of operation, the primary-side port 102 may supply each of the secondary-side ports 104. That is, the supply voltage $V_{IN}$ is used to control the output current $I_{BATT1}$ and output voltage $V_{BATT1}$ of the secondary-side port 104-1 and the output current $I_{BATT2}$ and output voltage $V_{BATT2}$ of the secondary-side port 104-2. In the second exemplary mode of operation, the secondary-side port 104-1 may supply both the primary-side port 102 and the other secondary-side port 104-2. In the third exemplary mode of operation, the switches $Q_1$-$Q_4$ of the primary-side converter 120 may be controlled to remain open while the secondary-side port 104-1 supplies the other secondary-side port 104-2.

Figure 14:
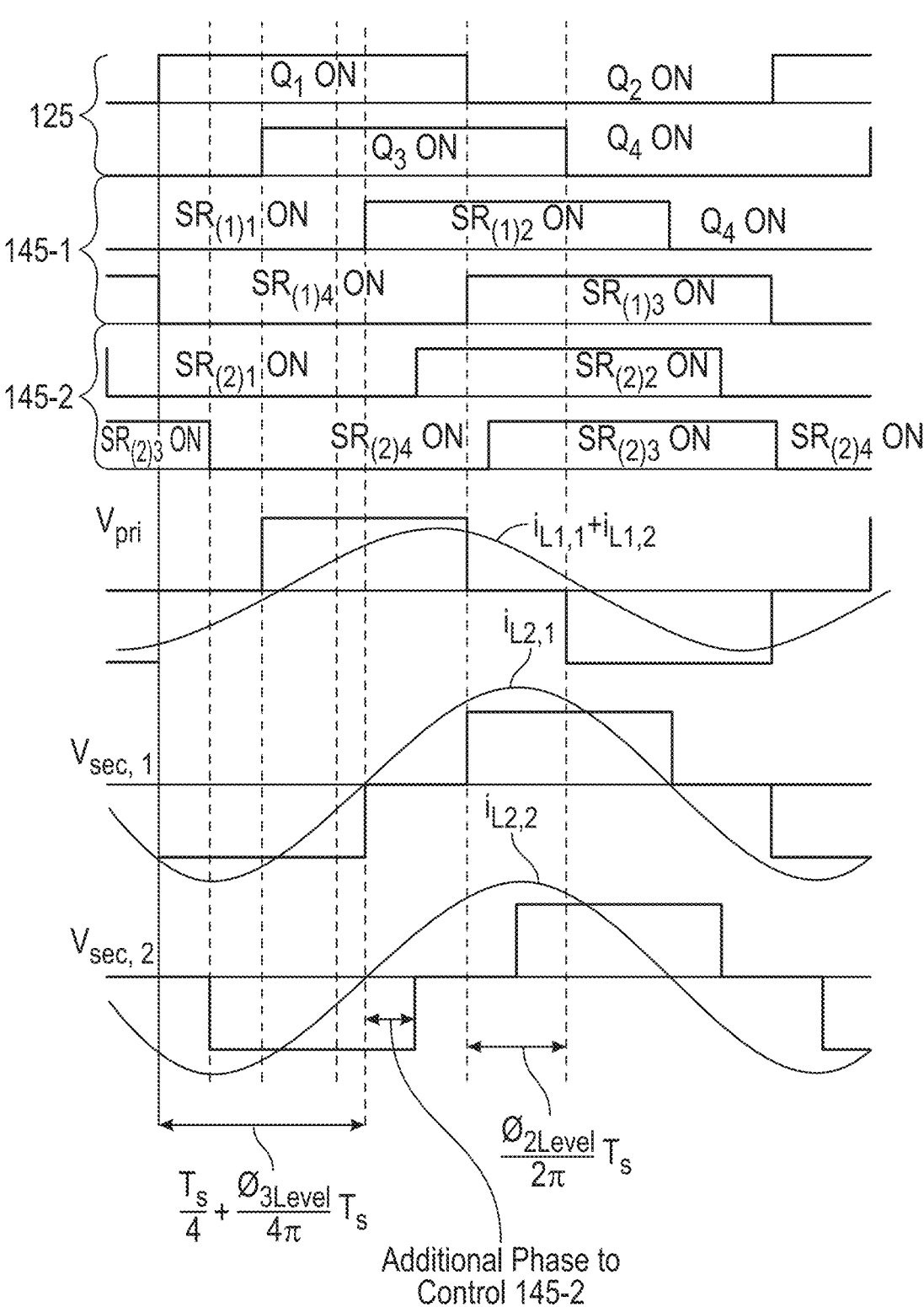
FIG. 14 is a timeline indicating switch positions and resulting voltages during a first exemplary mode of operation of the exemplary three-port bidirectional DC-DC converter of FIG. 13.

FIG. 14 is a timeline indicating switch positions and resulting voltages during the first exemplary mode of operation of the exemplary three-port bidirectional DC-DC converter 100 of FIG. 13. As previously noted, in the first exemplary mode of operation, the primary-side port 102 may supply power to both secondary-side ports 104-1 and 104-2. This mode may be referred to as a charging mode, for example, with the primary-side port 102 supplying power that originated at the grid.

FIG. 14 shows the position (on (closed) or off (open)) of each of the switches 125 $Q_1$-$Q_4$, 145-1 $SR_{(1)1}$-$SR_{(1)4}$, and 145-2 $SR_{(2)1}$-$SR_{(2)4}$ along with the currents $i_{L1,1}+i_{L1,2}$, $i_{L2,1}$, and $i_{L2,2}$, and voltages at the converters 120, 140-1, 140-2, indicated as $v_{pri}$, $v_{sec,1}$, and $v_{sec,2}$, respectively. The current $i_{L1,1}+i_{L1,2}$ is reflected at the primary-side port 102, while each of the currents $i_{L2,1}$ and $i_{L2,2}$ exhibits a 90 degree shift from the primary-side voltage $v_{pri}$. Based on both the secondary-side networks 150-1, 150-2 networks 1310, 1320, independent phase shift control with fixed frequency switching is facilitated.

That is, as shown, a phase shift of $$T_s/4 + \frac{\phi_{3level}}{4\pi}T_s$$

is used between the primary-side port 102 and the secondary-side port 104-1, while an "Additional Phase" may be used for switches 145-2 at the secondary-side port 104-2 to independently control $V_{BATT,2}$. When the "Additional Phase" is zero for the exemplary circuit of FIG. 13, $V_{BATT,1}$ and $V_{BATT,2}$ are approximately equal. A non-zero value of "Additional Phase" may instead be used to control the difference between $V_{BATT,1}$ and $V_{BATT,2}$.

Figure 15:
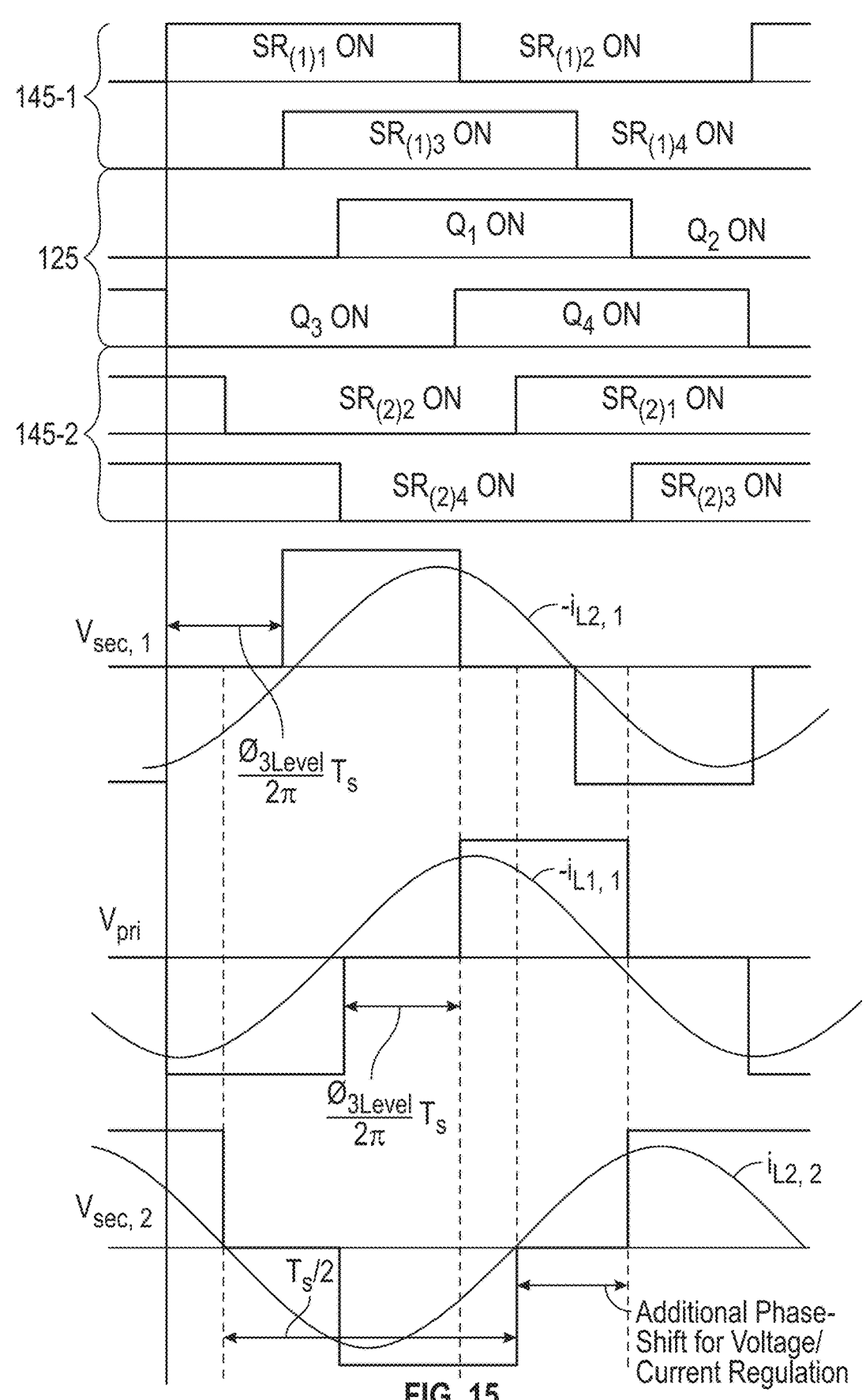
FIG. 15 is a timeline indicating switch positions and resulting voltages during a second exemplary mode of operation of the exemplary three-port bidirectional DC-DC converter of FIG. 13.

FIG. 15 is a timeline indicating switch positions and resulting voltages during the second exemplary mode of operation of the exemplary three-port bidirectional DC-DC converter 100 of FIG. 13. As previously noted, in the second exemplary mode of operation, the secondary-side port 104-1 may supply power to the primary-side port 102 and the secondary-side port 104-2. This mode may be referred to as a discharging mode, for example, because the battery $V_{BATT,1}$ of the primary-side port 104-1 that was previously charged may discharge in this mode.

FIG. 15 shows the position (on (closed) or off (open)) of each of the switches 125 $Q_1$-$Q_4$, 145-1 $SR_{(1)1}$-$SR_{(1)4}$, and 145-2 $SR_{(2)1}$-$SR_{(2)4}$ along with the currents $-i_{L2,1}$, $-i_{L1,1}$, and $i_{L2,2}$ and voltages at the converters 140-1, 120, 140-2, indicated as $v_{sec,1}$, $v_{pri}$, and $v_{sec,2}$, respectively. As FIG. 15 indicates, the switches 145-1 $SR_{(1)1}$-$SR_{(1)4}$ are operated first. As FIG. 15 also shows, the current $-i_{L1,1}$ is shifted 90 degrees from the voltage $v_{sec,1}$ at the secondary-side port 104-1, but the current $i_{L2,2}$ is shifted 180 degrees from the voltage $v_{sec,1}$. As noted with reference to FIG. 14, the "Additional Phase" may be controlled to vary $V_{BATT,2}$ from $V_{BATT,1}$.

Figure 16:
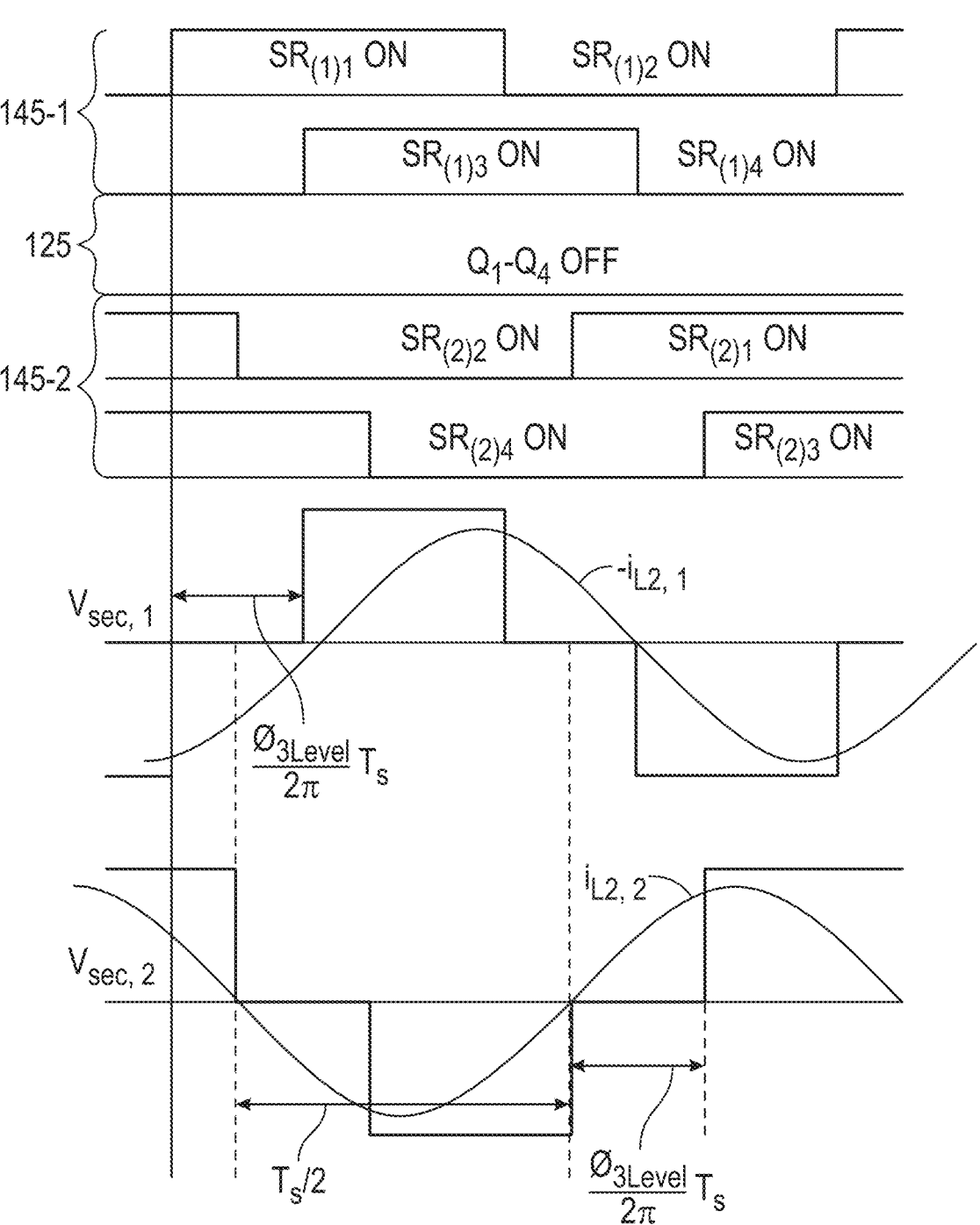
FIG. 16 is a timeline indicating switch positions and resulting voltages during a third exemplary mode of operation of the exemplary three-port bidirectional DC-DC converter of FIG. 13.

FIG. 16 is a timeline indicating switch positions and resulting voltages during the third exemplary mode of operation of the exemplary three-port bidirectional DC-DC converter 100 of FIG. 13. As previously noted, in the third exemplary mode of operation, the secondary-side port 104-1 may supply power to only the secondary-side port 104-2 while the primary-side switches 125 $Q_1$-$Q_4$ are all off. This mode of operation may be used while an EV is in drive mode, for example.

FIG. 16 shows the position (on (closed) or off (open)) of each of the switches 145-1 $SR_{(1)1}$-$SR_{(1)4}$, 125 $Q_1$-$Q_4$, and 145-2 $SR_{(2)1}$-$SR_{(2)4}$ along with the currents $-i_{L2,1}$ and $i_{L2,2}$, and voltages at the converters 140-1, 140-2, indicated as $v_{sec,1}$ and $v_{sec,2}$, respectively. As indicated, the primary-side switches 125 $Q_1$-$Q_4$ are all off. The current $i_{L2,2}$ is phase shifted 180 degrees from the voltage $v_{sec,1}$ at the secondary-side port 104-1. The delay from turn on of switch $SR_{(1)1}$ to turn on of switch $SR_{(1)3}$ and the delay from turn on of switch $SR_{(2)1}$ to turn on of switch $SR(2)3$ is $$\frac{\phi_{3level}}{2\pi}T_s$$

and the delay between the two sets of switches 145-1 and 145-2 is $$\frac{T_s}{2} + \frac{\phi_{3level}}{4\pi}T_s.$$

According to the various aspects and embodiments detailed herein:

A DC-DC converter includes a first port at a primary side of a transformer including a primary-side converter with primary-side switches, and a second port at a secondary side of the transformer. The second port includes a second port converter with second-port switches and a resonant circuit comprising a first inductor ($L_1$), a capacitor (C), and a second inductor ($L_2$) arranged in a "T" configuration (LCL-T). A third port at the secondary side of the transformer includes a third port converter with third-port switches. A controller controls the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

In the first mode, the controller controls the primary-side switches at the fixed frequency and to control the second-port switches and the third-port switches at the fixed frequency with a phase shift or delay from the primary-side switches.

In the second mode, the controller controls the second-port switches at the fixed frequency and to control the primary-side switches and the third-port switches at the fixed frequency with a phase shift or delay from the second-port switches.

In the third mode, the controller controls the primary-side switches to be open, the second-port switches at the fixed frequency, and the third-port switches at the fixed frequency with a phase shift from the second-port switches.

The controller controls the primary-side switches, the second-port switches, and the third-port switches at the fixed frequency in additional modes of operation including modes in which the third port supplies power to the first port, to the second port, or to both the first port and the second port.

The third port includes an inductor ($L_R$) and capacitor ($C_R$) as a series resonant circuit. In this case, $$L_1 = L_2 = L$$

$$C = \frac{1}{4\pi^2 f s^2 L}$$

-continued $$L_R = \frac{1}{4\pi^2 f s^2 C_R} \text{ and}$$

$$Q = \frac{\sqrt{\frac{L_R}{C_R}}}{\frac{8V_{BATT2}}{\pi^2 I_{BATT2}}}$$

fs is the fixed frequency at which the primary-side switches, the second-port switches, and the third-port switches are controlled, Q is a predefined quality factor, $V_{BATT2}$ is a voltage at an output of the third port, and $I_{BATT2}$ is a current at the output of the third port.

The third port comprises a network with only one inductor (L). In this case, $$L_2 = L_1 + L\frac{N_2^2}{N_3^2}$$

$$C = \frac{1}{4\pi^2 f s^2 L_2},$$

where
fs is the fixed frequency at which the primary-side switches, the second-port switches, and the third-port switches are controlled, $N_2$ is a number of windings at the second port, and $N_3$ is a number of windings at the third port. The first port includes an auxiliary inductor ($L_{aux}$), and $$L_{aux} = L\frac{N_1^2}{N_3^2}.$$

$N_1$ is a number of turns of a winding at the first port and $N_3$ is a number of windings at the third port. The first inductor ($L_1$) is a variable inductor and $$L_1 = L_2 - L\frac{N_2^2}{N_3^2}.$$

$N_2$ is a number of turns of a winding at the second port, and $N_3$ is a number of turns of a winding at the third port. Alternately, the second inductor ($L_2$) is a variable inductor and $L_2=L_1+$ $$L_2 = L_1 + L\frac{N_2^2}{N_3^2}.$$

$N_2$ is a number of windings at the second port, and $N_3$ is a number of windings at the third port.

The third port comprises a second resonant circuit includes another first inductor ($L_{1,2}$), another capacitor ($C_2$), and another second inductor ($L_{2,2}$) arranged in the "T" configuration (LCL-T).

There are one or more additional ports at the secondary side of the transformer. Each of the one or more additional ports includes an inductor and capacitor as a series resonant circuit, an LCL-T resonant circuit, or a network with only one inductor.

The first port, the second port, or the third port includes relays to dynamically change a configuration of the primary-side switches, second-port switches, or third-port switches to be half-bridges connected in series or in parallel or a full-bridge.

A power supply includes a power factor correction (PFC) converter to convert an alternating current (AC) source to direct current (DC). The power supply also includes a DC-DC converter coupled to the PFC. The DC-DC converter includes a first port at a primary side of a transformer including a primary-side converter with primary-side switches, and a second port at a secondary side of the transformer. The second port includes a second port converter with second-port switches and a resonant circuit comprising a first inductor ($L_1$), a capacitor (C), and a second inductor ($L_2$) arranged in a "T" configuration (LCL-T). The DC-DC converter also includes a third port at the secondary side of the transformer. The third port includes a third port converter with third-port switches. A controller controls the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

In the first mode, the controller controls the primary-side switches at the fixed frequency and controls the second-port switches and the third-port switches at the fixed frequency with a phase shift or delay from the primary-side switches. In the second mode, the controller controls the second-port switches at the fixed frequency and controls the primary-side switches and the third-port switches at the fixed frequency with a phase shift or delay from the second-port switches. In the third mode, the controller controls the primary-side switches to be open, the second-port switches at the fixed frequency, and the third-port switches at the fixed frequency with a phase shift from the second-port switches.

The DC-DC converter includes one or more additional ports at the secondary side of the transformer. Each of the one or more additional ports includes additional port switches and an inductor and capacitor as a series resonant circuit, an LCL-T resonant circuit, or a network with only one inductor. The controller controls the primary-side switches, the second-port switches, the third-port switches, and the additional port switches at the fixed frequency in additional modes of operation including modes in which the third port supplies power to the first port, to the second port, or to both the first port and the second port.

The third port includes an inductor ($L_R$) and capacitor ($C_R$) as a series resonant circuit. The third port includes a network with only one inductor (L), or the third port comprises a second resonant circuit comprising another first inductor ($L_{1,2}$), another capacitor ($C_2$), and another second inductor ($L_{2,2}$) arranged in the "T" configuration (LCL-T).

The first port, the second port, or the third port includes relays to dynamically change a configuration of the primary-side switches, second-port switches, or third-port switches to be half-bridges connected in series or in parallel or a full-bridge.

A method of assembling a DC-DC converter includes assembling a first port at a primary side of a transformer to include a primary-side converter with primary-side switches, and assembling a second port at a secondary side of the transformer to include a second port converter with second-port switches and a resonant circuit comprising a first inductor ($L_1$), a capacitor (C), and a second inductor ($L_2$) arranged in a "T" configuration (LCL-T). The method also includes assembling a third port at the secondary side of the transformer to include a third port converter with third-port switches. A controller controls the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

Although explanatory embodiments have been described, other embodiments are possible. Therefore, the spirit and scope of the claims should not be limited to the description of the exemplary embodiments. Various modifications and variations can be made without departing from the scope and principle of the present disclosure.

What is claimed is:
1. A DC-DC converter, comprising:
a first port at a primary side of a transformer including a primary-side converter with primary-side switches;
a second port at a secondary side of the transformer, the second port including a second port converter with second-port switches and a resonant circuit comprising a first inductor ($L_1$), a capacitor (C), and a second inductor ($L_2$) arranged in a "T" configuration (LCL-T);
a third port at the secondary side of the transformer, the third port including a third port converter with third-port switches; and
a controller configured to control the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

2. The DC-DC converter according to claim 1, wherein, in the first mode, the controller is configured to control the primary-side switches at the fixed frequency and to control the second-port switches and the third-port switches at the fixed frequency with a phase shift or delay from the primary-side switches.

3. The DC-DC converter according to claim 1, wherein, in the second mode, the controller is configured to control the second-port switches at the fixed frequency and to control the primary-side switches and the third-port switches at the fixed frequency with a phase shift or delay from the second-port switches.

4. The DC-DC converter according to claim 1, wherein, in the third mode, the controller is configured to control the primary-side switches to be open, the second-port switches at the fixed frequency, and the third-port switches at the fixed frequency with a phase shift from the second-port switches.

5. The DC-DC converter according to claim 1, wherein the controller is further configured to control the primary-side switches, the second-port switches, and the third-port switches at the fixed frequency in additional modes of operation including modes in which the third port supplies power to the first port, to the second port, or to both the first port and the second port.

6. The DC-DC converter according to claim 1, wherein the third port includes an inductor ($L_R$) and a capacitor ($C_R$) as a series resonant circuit.

7. The DC-DC converter according to claim 6, wherein $$L_1 = L_2 = L$$

$$C = \frac{1}{4\pi^2 fs^2 L}$$

$$L_R = \frac{1}{4\pi^2 fs^2 C_R} \text{ and}$$

$$Q = \frac{\sqrt{\frac{L_R}{C_R}}}{\frac{8V_{BATT2}}{\pi^2 I_{BATT2}}}$$

where
fs is the fixed frequency at which the primary-side switches, the second-port switches, and the third-port switches are controlled, Q is a predefined quality factor, $V_{BATT2}$ is a voltage at an output of the third port, and $I_{BATT2}$ is a current at the output of the third port.

8. The DC-DC converter according to claim 1, wherein the third port comprises a network with only one inductor (L).

9. The DC-DC converter according to claim 8, wherein $$L_2 = L_1 + L\frac{N_2^2}{N_3^2}$$

$$C = \frac{1}{4\pi^2 fs^2 L_2}$$

where
fs is the fixed frequency at which the primary-side switches, the second-port switches, and the third-port switches are controlled, $N_2$ is a number of windings at the second port, and $N_3$ is a number of windings at the third port.

10. The DC-DC converter according to claim 8, wherein the first port includes an auxiliary inductor (Laux), and $$L_{aux} = L\frac{N_1^2}{N_3^2}$$

where
$N_1$ is a number of turns of a winding at the first port and $N_3$ is a number of windings at the third port.

11. The DC-DC converter according to claim 8, wherein the first inductor ($L_1$) is a variable inductor and $$L_1 = L_2 - L\frac{N_2^2}{N_3^2}$$

where
$N_2$ is a number of turns of a winding at the second port, and $N_3$ is a number of turns of a winding at the third port, or the second inductor ($L_2$) is a variable inductor and $$L_2 = L_1 + L\frac{N_2^2}{N_3^2}$$

where

N$_2$ is a number of windings at the second port, and N$_3$ is a number of windings at the third port.

12. The DC-DC converter according to claim 1, wherein the third port comprises a second resonant circuit comprising another first inductor (L$_{1,2}$), another capacitor (C$_2$), and another second inductor (L$_{2,2}$) arranged in the "T" configuration (LCL-T).

13. The DC-DC converter according to claim 1, further comprising one or more additional ports at the secondary side of the transformer, wherein each of the one or more additional ports includes an inductor and a capacitor as a series resonant circuit, an LCL-T resonant circuit, or a network with only one inductor.

14. The DC-DC converter according to claim 1, wherein the first port, the second port, or the third port includes relays to dynamically change a configuration of the primary-side switches, second-port switches, or third-port switches to be half-bridges connected in series or in parallel or a full-bridge.

15. A power supply comprising:

a power factor correction (PFC) converter configured to convert an alternating current (AC) source to direct current (DC); and a DC-DC converter coupled to the PFC, the DC-DC converter comprising:

a first port at a primary side of a transformer including a primary-side converter with primary-side switches;

a second port at a secondary side of the transformer, the second port including a second port converter with second-port switches and a resonant circuit comprising a first inductor (L$_1$), a capacitor (C), and a second inductor (L$_2$) arranged in a "T" configuration (LCL-T);

a third port at the secondary side of the transformer, the third port including a third port converter with third-port switches; and a controller configured to control the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

16. The power supply according to claim 15, wherein, in the first mode, the controller is configured to control the primary-side switches at the fixed frequency and to control the second-port switches and the third-port switches at the fixed frequency with a phase shift or delay from the primary-side switches, in the second mode, the controller is configured to control the second-port switches at the fixed frequency and to control the primary-side switches and the third-port switches at the fixed frequency with a phase shift or delay from the second-port switches, and, in the third mode, the controller is configured to control the primary-side switches to be open, the second-port switches at the fixed frequency, and the third-port switches at the fixed frequency with a phase shift from the second-port switches.

17. The power supply according to claim 15, further comprising one or more additional ports at the secondary side of the transformer, wherein each of the one or more additional ports includes additional port switches and an inductor and a capacitor as a series resonant circuit, an LCL-T resonant circuit, or a network with only one inductor, wherein the controller is further configured to control the primary-side switches, the second-port switches, the third-port switches, and the additional port switches at the fixed frequency in additional modes of operation including modes in which the third port supplies power to the first port, to the second port, or to both the first port and the second port.

18. The power supply according to claim 15, wherein the third port includes an inductor (L$_R$) and a capacitor (C$_R$) as a series resonant circuit, the third port comprises a network with only one inductor (L), or the third port comprises a second resonant circuit comprising another first inductor (L$_{1,2}$), another capacitor (C$_2$), and another second inductor (L$_{2,2}$) arranged in the "T" configuration (LCL-T).

19. The power supply according to claim 15, wherein the first port, the second port, or the third port includes relays to dynamically change a configuration of the primary-side switches, second-port switches, or third-port switches to be half-bridges connected in series or in parallel or a full-bridge.

20. A method of assembling a DC-DC converter, the method comprising:

assembling a first port at a primary side of a transformer to include a primary-side converter with primary-side switches;

assembling a second port at a secondary side of the transformer to include a second port converter with second-port switches and a resonant circuit comprising a first inductor (L$_1$), a capacitor (C), and a second inductor (L$_2$) arranged in a "T" configuration (LCL-T);

assembling a third port at the secondary side of the transformer to include a third port converter with third-port switches; and configuring a controller to control the primary-side switches, the second-port switches, and the third-port switches at a fixed frequency for operation in a first mode, in which the first port supplies power to the second port and the third port, in a second mode, in which the second port supplies power to the first port and the third port, or in a third mode, in which the second port supplies power to the third port while the first port is disconnected.

* * * * *